US012619682B2

(12) United States Patent \
Patino Virano et al.

(10) Patent No.: US 12,619,682 B2 \
(45) Date of Patent: May 5, 2026

(54) IDENTIFYING OPERATION ANOMALIES OF SUBTERRANEAN DRILLING EQUIPMENT

(71) Applicant: Schlumberger Technology Corporation, Sugar Land, TX (US)

(72) Inventors: Diego Fernando Patino Virano, Katy, TX (US); Darine Mansour, Katy, TX (US); Sai Venkatakrishnan Sankaranarayanan, Cambridge (GB); Yingwei Yu, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 136 days.

(21) Appl. No.: 17/451,945

(22) Filed: Oct. 22, 2021

(65) Prior Publication Data

US 2022/0195861 A1 Jun. 23, 2022

Related U.S. Application Data

(60) Provisional application No. 63/199,293, filed on Dec. 18, 2020.

(51) Int. Cl.
| | |
|---|---|
| *G06F 18/2321* | (2023.01) |
| *G06Q 10/0639* | (2023.01) |
| *G06Q 50/02* | (2024.01) |

(52) U.S. Cl.
CPC ..... *G06F 18/2321* (2023.01); *G06Q 10/0639* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 2013/0085715 A1* | 4/2013 | Lakshminarayan .... | G06F 18/00 702/179 |
| 2015/0081221 A1* | 3/2015 | Mancini ................. | E21B 44/00 702/9 |

(Continued)

FOREIGN PATENT DOCUMENTS

| | | | | |
|---|---|---|---|---|
| WO | WO-2018232198 A1 * | 12/2018 | ............. | E21B 41/00 |
| WO | 2019222122 A1 | 11/2019 | | |

OTHER PUBLICATIONS

Mojeddifar, S., M. Hemmati Chegeni, and M. Lashkari Ahangarani. "Gas-bearing reservoir characterization using an adjusted Parzen probabilistic network." Oct. 1, 2018. Journal of Petroleum Science and Engineering 169 (2018): 445-453. (Year: 2018).*

(Continued)

*Primary Examiner* — Sara Grace Brown \
(74) *Attorney, Agent, or Firm* — Kyle R. Miiller

(57) ABSTRACT

The present disclosure relates to systems, methods, and non-transitory computer-readable media for dynamically utilizing, in potentially real time, anomaly pattern detection to optimize operational processes relating to well construction or subterranean drilling. For example, the disclosed systems use time-series data combined with rig states to automatically detect and split similar operations. Subsequently, the disclosed systems identify operation anomalies from a field-data collection utilizing an automated anomaly detection workflow. The automated anomaly detection workflow can identify operation anomalies at a more granular level by determining which process behavior contributes to the operation anomaly (e.g., according to corresponding process probabilities for a given operation). In addition, the disclosed systems can present graphical representations of operation anomalies, process behaviors (procedural curves), (Continued)

900

902 Identifying Time-series Data For Subterranean Drilling Equipment

904 Generating, Utilizing A Feature Extraction Model And From The Time-series Data, Operation Features Defining Operation Of The Subterranean Drilling Equipment Over Time 906 Generating Feature Probabilities For The Operation Features 908 Identifying An Anomaly Of The Operation Of The Subterranean Drilling Equipment Based On The Feature Probabilities For The Operation Features and/or corresponding process probabilities in an intuitive, user-friendly manner.

12 Claims, 16 Drawing Sheets

(56)                    References Cited

U.S. PATENT DOCUMENTS

| 2015/0235544 | A1* | 8/2015 | Hernandez | E21B 47/10 |
| | | | | 340/853.1 |
| 2016/0312552 | A1* | 10/2016 | Early | E21B 41/00 |
| 2017/0198553 | A1* | 7/2017 | Dykstra | E21B 21/01 |
| 2018/0039900 | A1* | 2/2018 | Hoeink | E21B 25/005 |
| 2018/0075544 | A1* | 3/2018 | Passolt | E21B 41/00 |
| 2018/0087372 | A1* | 3/2018 | Stokely | E21B 47/095 |
| 2018/0171774 | A1* | 6/2018 | Ringer | E21B 47/024 |
| 2018/0335772 | A1* | 11/2018 | Gorinevsky | G06Q 10/20 |
| 2019/0243872 | A1* | 8/2019 | Komatsu | G06F 18/22 |
| 2019/0287005 | A1 | 9/2019 | Subramaniyan et al. | |
| 2019/0317488 | A1 | 10/2019 | Al-Maghlouth et al. | |
| 2019/0361138 | A1* | 11/2019 | Bennett | G01V 1/52 |
| 2020/0080412 | A1 | 3/2020 | Johnsen et al. | |
| 2020/0291765 | A1 | 9/2020 | Chanpura et al. | |
| 2020/0302353 | A1* | 9/2020 | Tang | G06Q 10/0635 |
| 2020/0347700 | A1 | 11/2020 | Yu | |
| 2021/0381361 | A1* | 12/2021 | Maus | E21B 47/09 |
| 2022/0147034 | A1* | 5/2022 | Geipel | G05B 23/024 |
| 2022/0179406 | A1* | 6/2022 | Zope | G05B 23/0254 |
| 2022/0260988 | A1* | 8/2022 | Fridley | G05B 13/048 |
| 2022/0275610 | A1* | 9/2022 | Bohorquez Arevalo | |
| | | | | E03B 7/071 |
| 2022/0334574 | A1* | 10/2022 | Basak | G05B 23/024 |
| 2022/0373530 | A1* | 11/2022 | Premanadhan | G01N 11/04 |
| 2023/0358596 | A1* | 11/2023 | Takehira | G01H 1/003 |

OTHER PUBLICATIONS

Li, Yupeng, et al. "Diagnosis of downhole incidents for geological drilling processes using multi-time scale feature extraction and probabilistic neural networks." Feb. 14, 2020. Process Safety and Environmental Protection 137 (2020): 106-115. (Year: 2020).*

Sebastian Raschka, Kernel Density Estimation Via The Parzen-Rosenblatt Window Method, (Jun. 19, 2014), archived at sebastianraschka.com Articles/2014_kernel_density_est.html, accessed via the Internet on Oct. 20, 2021 (51 pages).

Search Report and Written Opinion of International Patent Application No. PCT/US2021/071990 dated Feb. 11, 2022, 11 pages.

International Preliminary Report on Patentability of International Patent Application No. PCT/US2021/071990 dated Jun. 29, 2023, 7 pages.

Tang, H. et al., "Time series data analysis for automatic flow influx detection during drilling", Journal of Petroleum Science and Engineering, 2019, 172, pp. 1103-1111.

Wang, C. et al., "Downhole working conditions analysis and drilling completions detection method based on deep learning", Journal of Natural Gas Science and Engineering, 2020, 81, 19 pages.

* cited by examiner

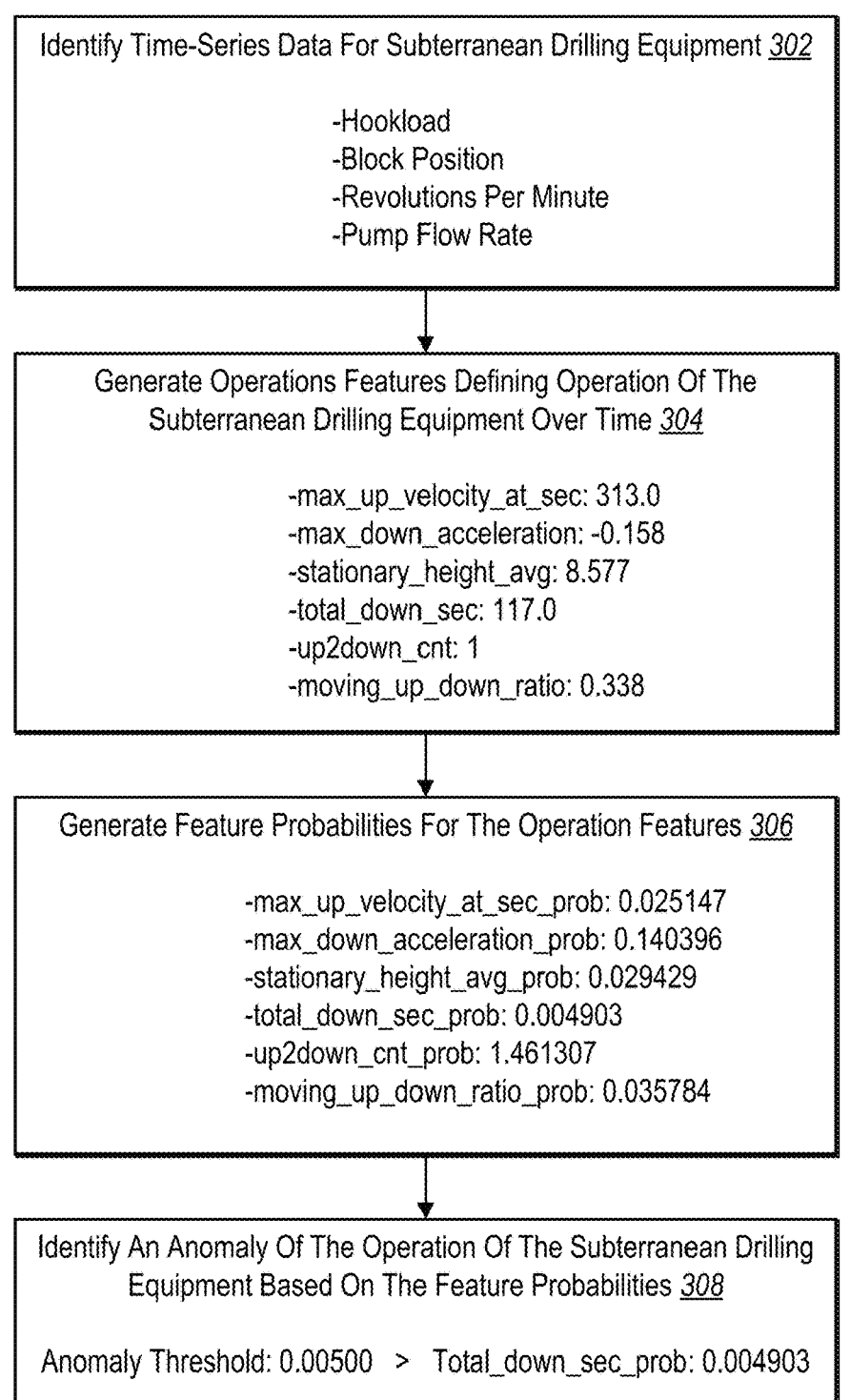

Identify Time-Series Data For Subterranean Drilling Equipment _302_

-Hookload
-Block Position
-Revolutions Per Minute
-Pump Flow Rate

Generate Operations Features Defining Operation Of The Subterranean Drilling Equipment Over Time _304_

-max_up_velocity_at_sec: 313.0
-max_down_acceleration: -0.158
-stationary_height_avg: 8.577
-total_down_sec: 117.0
-up2down_cnt: 1
-moving_up_down_ratio: 0.338

Generate Feature Probabilities For The Operation Features _306_

-max_up_velocity_at_sec_prob: 0.025147
-max_down_acceleration_prob: 0.140396
-stationary_height_avg_prob: 0.029429
-total_down_sec_prob: 0.004903
-up2down_cnt_prob: 1.461307
-moving_up_down_ratio_prob: 0.035784

Identify An Anomaly Of The Operation Of The Subterranean Drilling Equipment Based On The Feature Probabilities _308_

Anomaly Threshold: 0.00500  >  Total_down_sec_prob: 0.004903

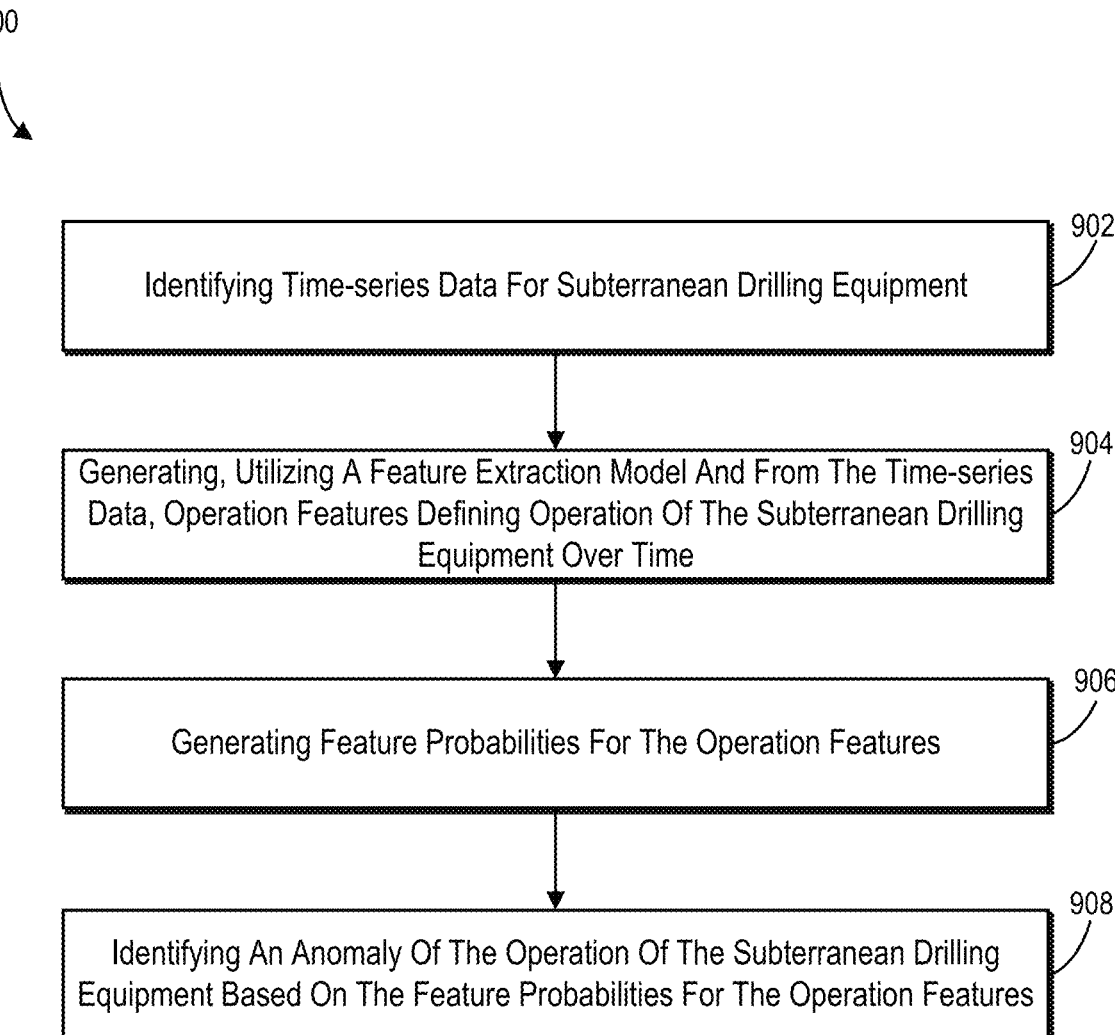

902

Identifying Time-series Data For Subterranean Drilling Equipment

904

Generating, Utilizing A Feature Extraction Model And From The Time-series Data, Operation Features Defining Operation Of The Subterranean Drilling Equipment Over Time

906

Generating Feature Probabilities For The Operation Features

908

Identifying An Anomaly Of The Operation Of The Subterranean Drilling Equipment Based On The Feature Probabilities For The Operation Features

*Fig. 9*

IDENTIFYING OPERATION ANOMALIES OF SUBTERRANEAN DRILLING EQUIPMENT

CROSS-REFERENCE TO RELATED APPLICATIONS

This application claims the benefit of U.S. provisional application No. 63/199,293 filed on 18 Dec. 2020 and titled "Similarity and Anomaly Recognition in Drilling Operations", which is hereby incorporated herein in its entirety by reference.

BACKGROUND

Recent years have seen significant improvements in extracting and identifying operational performance data associated with subterranean drilling. Unfortunately, a number of problems still exist with conventional systems for identifying operation anomalies. For example, conventional drilling anomaly systems implement key performance indicators or other aggregate measures of drilling operation processes that suffer from low interpretability. In addition, certain conventional drilling anomaly systems are not capable of real-time anomaly identification. Moreover, some conventional drilling anomaly systems promote selective (and subjective) review of certain drilling parameters that may appear anomalous but are not.

To illustrate, conventional drilling anomaly systems can measure drilling operation processes, but these systems often fail to measure drilling operation processes in a way that provides constructive feedback for improving the measured process. For instance, conventional drilling anomaly systems use key performance indicators (or other aggregate measures). However, these indicators are often averages or other statistical values that, of themselves, are difficult for field personnel to interpret and/or develop improvement plans for the particular drilling operation process. Accordingly, key performance indicators are often perceived as too vague/complex to understand. Other alternatives, such as histograms, likewise fail to provide an effective mechanism for improving a measured drilling operation process.

In addition to a lack of interpretability, conventional drilling anomaly systems are often of little use in real-time field operation. For example, some conventional drilling anomaly systems use key performance indicators or other measures that aggregate drilling operation data over time. Accordingly, such conventional drilling anomaly systems are typically incapable of identifying anomalous drilling operation processes as they occur because a key performance indicator is still (over the aggregate) within tolerance or an accepted range. As a result, conventional drilling anomaly systems operate with reduced accuracy and real-time effectiveness.

Based in part on the foregoing deficiencies, some conventional drilling anomaly systems promote selective (and subjective) review of certain drilling parameters. For example, a drilling engineer in the field may conduct a post-drilling-session review of a drilling session average for one or more drilling parameters relative to a historical aggregate of drilling sessions. Such manual approaches often fail to produce accurate results. Indeed, identified anomalies are rarely actual anomalies, and perceived normal data is not necessarily normal. These common discrepancies are due to the myriad different variables that mere observation and the human mind cannot practically capture with any consistent degree of accuracy. Indeed, the complex interplay between the various drilling parameters (e.g., hookload, block position, revolutions per minute, pump flow rate, rate of penetration, etc.), rig states (e.g., pre-connection activities, connection activities, and post-connection activities), contextual data (e.g., drilling operator, date and time, geological formation, drilling metric, bottom-hole assembly, drilling fluid, etc.), and other contributing factors is beyond the mental capacity of the human mind to evaluate—let alone determine anomalies.

SUMMARY

Aspects of the present disclosure can include methods, computer-readable media, and systems that dynamically utilize a feature extraction model to determine behavior anomalies in time-series drilling data. In particular, the disclosed systems partition the time-series drilling data into similar activities, such as pre-connection activities, connection activities, and rotary drilling. From the partitioned data, the disclosed systems extract a collection of features using a feature extraction model. Such a collection of features includes, for instance, maximum or minimum velocity (and/or acceleration) of a traveling block, maximum and minimum block height, total block time moving upwards and downwards, etc. In one or more embodiments, the disclosed systems determine a corresponding probability density function for each feature. Subsequently, the disclosed systems determine an anomaly based on a minimum probability for one or more features satisfying an anomaly threshold.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 3 illustrates an anomaly detection system identifying an operation anomaly in accordance with one or more embodiments.

FIG. 9 illustrates a flowchart of a series of acts for identifying an operation anomaly of subterranean drilling equipment in accordance with one or more embodiments.

DETAILED DESCRIPTION

Figure 1:
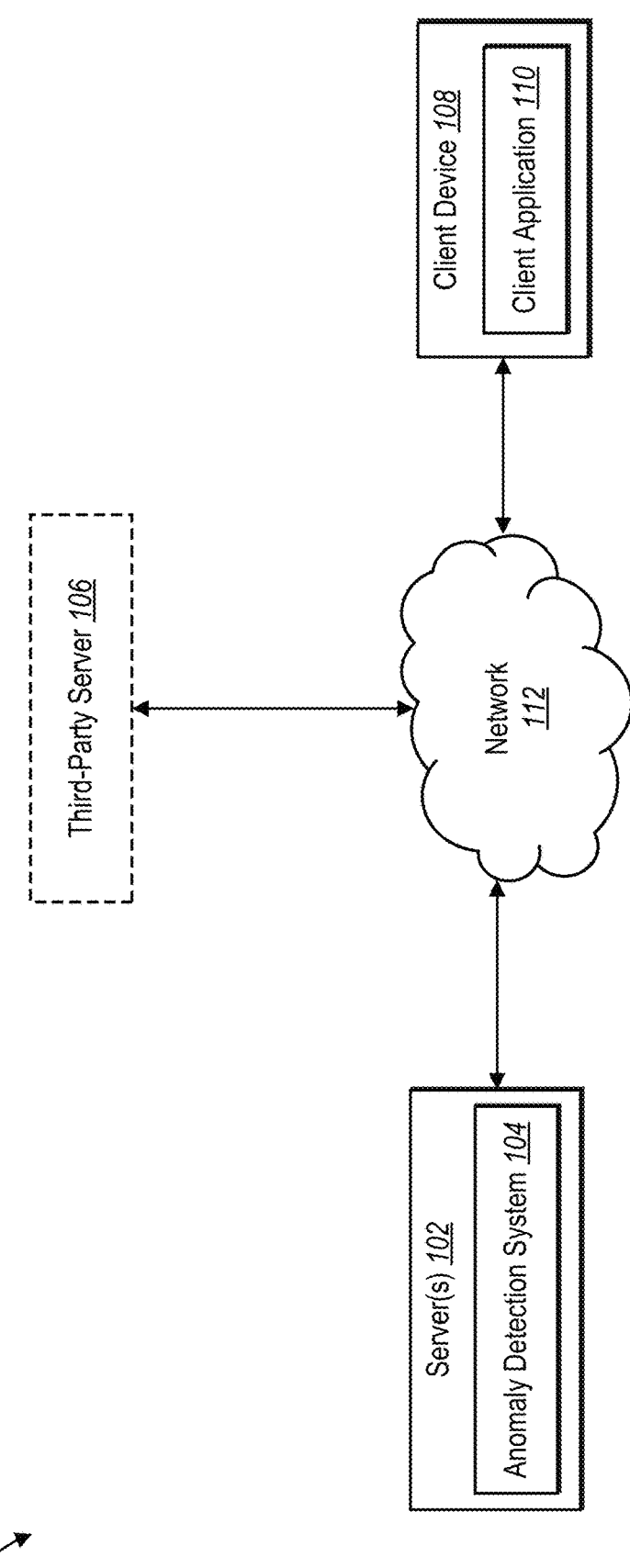
FIG. 1 illustrates a computing system environment for implementing an anomaly detection system in accordance with one or more embodiments.

One or more embodiments described herein include an anomaly detection system that selectively utilizes extracted operation features of time-series data combined with rig states to identify an anomaly and present a graphical representation explaining the identified anomalies. For example, in one or more embodiments, the anomaly detection system uses sensor data corresponding to at least one of hookload, block position, revolutions per minute, or pump flowrate. The anomaly detection system then partitions the sensor data based on rig states and their time spans. In certain embodiments, the anomaly detection system uses the partitioned data to extract operation features and determine respective feature histograms. Additionally, in one or more embodiments, the anomaly detection system converts the feature histograms to continuous probability datasets for estimating feature probabilities. Based on the estimated feature probabilities, the anomaly detection system can present, for display within a graphical user interface, an anomaly visualization indicating an identified anomaly and one or more operation features contributing to the identified anomaly.

As just mentioned, the anomaly detection system identifies and partitions time-series data for subterranean drilling equipment. The time-series data corresponds to a variety of different sensor data (e.g., surface sensor data) from sensors that track operation of subterranean drilling equipment. In one or more embodiments, the anomaly detection system partitions the time-series data into one or more levels of granularity for certain rig states (or operation states) such as pre-connection activities, connection activities, and post-connection activities. Additionally, or alternatively, the anomaly detection system partitions the time-series data based on contextual data such as drilling operator, date and time, geological formation, bottom-hole assembly, drilling fluid, etc. Still further, the anomaly detection system can partition the time-series data based on one or more drilling metrics such as torque, weight on bit, and rate of penetration.

In certain embodiments, the anomaly detection system uses the partitioned data to extract operation features. In particular embodiments, the anomaly detection system extracts operation features by filtering the partitioned time-series data. In certain implementations, the anomaly detection system uses a zero-lag difference of Gaussian filter to estimate feature signals, such as velocity and acceleration values for different operation features. Example operation features for a traveling block include maximum up velocity at time x, maximum down acceleration, and up to down count. It will be appreciated that the anomaly detection system can represent the feature signals of operation features in the form of discrete datasets such as histograms.

In one or more embodiments, the anomaly detection system converts the estimated feature signals (e.g., in the form discrete datasets) to corresponding probability density functions. In particular embodiments, the anomaly detection system uses a non-parametric model (e.g., Parzen's Window model) to generate probability density functions. Based on the probability density functions, the anomaly detection system determines a feature probability for each of the operation features.

If the feature probability satisfies an anomaly threshold, the anomaly detection system determines that the operation feature is an anomaly. For example, in certain implementations, the anomaly detection system ranks the operation features according to their probability values. If the lowest probability value is less than an anomaly threshold, the anomaly detection system determines a corresponding set of time-series data is anomalous. Additionally, or alternatively, the anomaly detection system compares the anomaly threshold to each probability value for the operation features to determine whether an operation feature is an anomaly.

Moreover, the anomaly detection system provides an anomaly visualization for display within a graphical user interface. In particular embodiments, the anomaly visualization comprises an indication that the time-series data is an anomaly. At a more granular level though, the anomaly visualization also comprises an indication as to why the time-series data is an anomaly. Specifically, the anomaly detection system generates anomaly visualizations that include which operation feature(s) satisfied the anomaly threshold, and are therefore, anomalies. For instance, the anomaly visualization comprises a plain-text description of the anomalous operation feature(s) and/or a graphical representation of the anomalous operation feature(s).

In one or more embodiments, the anomaly detection system also provides interactive graphical representations of time-series data. In particular embodiments, such interactive graphical representations incorporating clusters of feature curves are helpful for feature engineering and/or validation of extracted features from partitioned data. To illustrate, these interactive graphical representations show how the anomaly detection system dynamically determines anomalies and updates clusters of feature curves based on an adjustable (e.g., slidable) anomaly threshold.

As mentioned above, conventional drilling anomaly systems suffer from a number of issues. In contrast, the anomaly detection system can provide various advantages over such conventional drilling anomaly systems. For example, the anomaly detection system can identify an anomaly within time-series data and, moreover, indicate the identified anomaly in an easily interpretable manner. To illustrate, the anomaly detection system extracts operation features from the time-series data and provides an anomaly visualization graphically depicting which operation feature(s) contribute to the anomaly and why. In one or more embodiments, the anomaly detection system further provides interactive clusters of feature curves visually showing how anomalies change in response to a user interaction (e.g., adjustment of an anomaly threshold slider).

Further to the point, the anomaly detection system can improve interpretability relative to some drilling anomaly systems that cluster directly from time-series data. Indeed, this approach of some drilling anomaly systems can lead to false positives due to interpretation of samples away from the cluster center as anomalies. In particular, such samples away from these cluster centers can still be a "common" sampling or curve and/or may not directly represent an anomaly. Accordingly, the anomaly detection system improves interpretability over such systems because the anomaly detection system utilizes a feature-based approach where clusters are based on extracted operation features— not directly from time-series data. Therefore, by clustering at a feature level, the anomaly detection system can improve the accuracy of cluster representations and, in turn, the stability of interpreting them.

In a similar vein, the anomaly detection system can improve an operational flexibility of an implementing computing device to utilize variable lengths and/or dimensions of time-series data. Indeed, certain drilling anomaly systems encounter significant accuracy and cluster representation issues when utilizing time-series data of different lengths (e.g., because machine-learning models often cannot accurately organize the different lengths of time-series data within a matrix). In contrast, the anomaly detection system uses a feature-based approach that renders rigid input constraints moot. Moreover, by avoiding curve length constraints, the anomaly detection system can more flexibly (and more accurately) represent an anomalous event.

In addition to improved interpretability and flexibility, the anomaly detection system is configured to identify anomalies in batch mode or real-time mode. For example, unlike conventional drilling anomaly systems, the anomaly detection system of the present disclosure can identify anomalous time-series data in real-time as the anomaly detection system receives sensor data corresponding to one or more sensors. In particular, the anomaly detection system can generate feature probabilities on the fly based on identified feature signals for operation features. The anomaly detection system can then compare the feature probabilities to an anomaly threshold for identifying an anomaly. In turn, the anomaly detection system can present an anomaly visualization indicating the anomaly during the anomalous drilling operation and in real-time (or near real-time).

As illustrated by the foregoing discussion, the present disclosure utilizes a variety of terms to describe features and benefits of the anomaly detection system. Additional detail is now provided regarding the meaning of these terms. For example, as used herein, the term "time-series data" refers to drilling data corresponding to subterranean drilling equipment. In particular embodiments, time-series data includes time-stamped sensor data for sensors tracking operation of subterranean drilling equipment. Examples of time-series data include measured values of hookload, block position, revolutions per minute, pump flowrate, pressure, torque, etc.

Relatedly, the term "subterranean drilling equipment" refers to one or more devices or components used to perform drilling or exploration in a geological environment. In particular embodiments, subterranean drilling equipment can include devices or components for sensing, drilling, injecting, extracting, fracturing, tripping pipe, or other operation in relation to a drill well, a geological surface (or subsurface), an ocean/lake environment, or a subterranean reservoir. A few examples of subterranean drilling equipment include a traveling block, drill string, drill bit, Kelly drive, rotary table, standpipe, and mud pump.

As also used herein, the term "feature extraction model" refers to computer-executable instructions in the form of one or more of heuristics, filters, algorithms, or machine-learning models for determining operation features. In particular embodiments, a feature extraction model generates feature signals (e.g., velocity, acceleration, time, position, direction, range, count, etc.) for the time-series data as a function of time, operation state, contextual data, and/or other partitionable data bucket. For example, a feature extraction model includes a zero-lag Difference of Gaussian (ZL-DoG) filter or a Difference of Gaussians (DoG) filter.

As further used herein, the term "operation features" refers to elements, properties, or attributes of feature signals. In particular embodiments, operation features include curve characteristics for a feature signal. For example, operation features for a traveling block include maximum up velocity at time x, leading stationary time, minimum height, total direction change count, duration, total down time, maximum up acceleration, etc.

Additionally, as used herein, the terms "anomaly" or "operation anomaly" refer to an abnormality of time-series data. In particular embodiments, an anomaly includes an outlier of time-series data due to one or more operation features corresponding to a feature probability that satisfies an anomaly threshold (e.g., a minimum probability value for non-anomalous data). Moreover, it will be appreciated that the anomaly threshold is adjustable and/or configured for user customization. Therefore, an anomaly is not limited to a specific subset of time-series data.

As also used herein, the term "feature probability" refers to a probability or estimated likelihood that a given operation feature corresponds to a certain value. In particular embodiments, a feature probability includes an estimated probability value based on a probability density function. For example, an operation feature of maximum up velocity at time 313 seconds may correspond to a feature probability of 2.51%, and another operation feature of minimum height of 5.72 meters may correspond to a feature probability of 86.02%.

Further, as used herein, the term "operation state" refers to a drilling rig status. In particular embodiments, an operation state defines the category of ongoing drilling operations at a given point in time. For example, an operation state includes pre-connection activities (e.g., that relate to drilling off, moving a drill string to a connection point, and stopping rotation and pumps). Additionally, for instance, an operation state includes connection activities (e.g., that relate to assembling a drill string). Further, an operation state can include post-connection activities (e.g., that relate to drilling, tripping pipe, and/or processes occurring from removing slips until the drill bit is on bottom). Specifically, post-connection activities can include starting pumps, taking surveys, ensuring bottom hole assemblies are free, initiating rotation, resetting weight on bit, and going on bottom.

As used herein, the term "anomaly visualization" refers to a graphical presentation of an anomaly. In particular embodiments, an anomaly visualization can include a plain-text description (e.g., a text-based notification, listing, explanation, or identification) of each operation feature identified as anomalous. Additionally, or alternatively, an anomaly visualization can include a corresponding feature probability for the operation feature identified as anomalous. In certain cases, an anomaly visualization includes a chart, graph, or other visual indicating a difference between normal or acceptable values for an operation feature and the given anomalous value of the operation feature. In one or more embodiments, an anomaly visualization also includes interactive components. To illustrate, an anomaly visualization can include operation feature curves (e.g., multi-dimensional feature representations of feature signals) forming one or more clusters within a graphical user interface, such as a two-dimensional or three-dimensional T-SNE plot.

As also used herein, the term "contextual data" refers to drilling operation variables providing context to time-series data. For example, contextual data includes a drilling operator, date and time, geological formation, bottom-hole assembly, drilling fluid, drill-well (or well number), field or reservoir identifier, global positioning coordinate(s), county (and/or province, state, or country), etc. Additional examples of contextual data include a drilling metric or performance metric such as weight on bit, torque, standpipe pressure, revolutions per minute, rate of penetration, dog-leg severity, an efficiency/cost metric, safety/risk levels, etc. Still further, other examples of contextual data may include drilling events that refer to a drilling-related occurrence, incident, or time span. To illustrate, contextual data as drilling events can include rig non-productive time, bit trip, twist off, mud motor failure, rotary steerable systems failure, measurement while drilling failure, surface waiting, wellbore instability, downhole tool failure, tight hole, influx, stuck pipe, gas, lost circulation, and the like. Alternatively, contextual data can include the risk or probability of one or more drilling events occurring.

As used herein, the term "non-parametric model" refers to a computer model for determining a probability density function. Examples of a non-parametric model include machine-learning models for density estimation such as a decision tree, k-nearest neighbor classifier, or kernel regression. In certain implementations, a non-parametric model includes the Parzen-window method (e.g., as described by Sebastian Raschka, *Kernel Density Estimation Via The Parzen-Rosenblatt Window Method*, (Jun. 19, 2014), the contents of which are expressly incorporated herein by reference).

Additional detail will now be provided regarding the anomaly detection system in relation to illustrative figures portraying example embodiments and implementations. For example, FIG. 1 illustrates a computing system environment (or "environment") 100 for implementing an anomaly detection system 104 in accordance with one or more embodiments. As shown in FIG. 1, the environment 100 includes server(s) 102, an optional third-party server 106, a client device 108, and a network 112. Each of the components of the environment 100 can communicate via the network 112, and the network 112 may be any suitable network over which computing devices can communicate. Example networks are discussed in more detail below in relation to FIG. 10.

As shown in FIG. 1, the environment 100 includes client device 108. The client device 108 can be one of a variety of computing devices, including a smartphone, tablet, smart television, desktop computer, laptop computer, virtual reality device, augmented reality device, or other computing device as described in relation to FIG. 10. Although FIG. 1 illustrates a single client device 108, in certain embodiments the environment 100 includes multiple client devices 108. The client device 108 can further communicate with the server(s) 102 via the network 112. For example, the client device 108 can receive user input and provide information pertaining to the user input (e.g., that relates to adjusting an anomaly threshold) to the server(s) 102.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including information that is responsive to one or more user inputs. For example, the anomaly detection system 104 can instruct the client application 110 to display, at a user interface of the client device 108, an anomaly visualization depicting an anomaly corresponding to a particular operation feature extracted from time-series data. In one or more embodiments, the user can also interact with the client application 110 to view or modify clusters of operation feature curves.

As mentioned, the environment 100 optionally includes the third-party server 106. The third-party server 106 can include a variety of computing devices as described in relation to FIG. 10. In certain embodiments, the third-party server 106 can gather, store, transmit, or relay sensor data corresponding to one or more sensors associated with subterranean drilling equipment. In additional or alternative embodiments, the third-party server 106 generates and/or stores drill-well data for observed drill-wells in one or more geographic regions. For example, the third-party server 106 may include a field database (e.g., with drill-well data for all drill-wells of one or more oil fields) from which the anomaly detection system 104 can retrieve and/or request data. Although FIG. 1 illustrates a single third-party server 106, in particular embodiments the environment 100 can include multiple different third-party servers 106. In addition, the third-party server 106 can communicate with the server(s) 102 via the network 112 or multiple client devices.

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server.

In particular embodiments, the server(s) 102 identify time-series data for subterranean drilling equipment. Additionally, the server(s) 102 can generate operation features defining operation of the subterranean drilling equipment over time (e.g., by utilizing a feature extraction model and the time-series data). Further, the server(s) 102 can generate feature probabilities for the operation features. In turn, the server(s) 102 identify an anomaly of the operation of the subterranean drilling equipment based on the feature probabilities for the operation features.

Although FIG. 1 depicts the anomaly detection system 104 located on the server(s) 102, in some embodiments, the anomaly detection system 104 may be implemented by one or more other components of the environment 100 (e.g., by being located entirely or in part at one or more of the other components). For example, the anomaly detection system 104 may be implemented by the client device 108, the third-party server 106, and/or another suitable device.

In certain embodiments, though not illustrated in FIG. 1, the environment 100 may have a different arrangement of components and/or may have a different number or set of components altogether. For example, the client device 108 and/or the third-party server 106 may communicate directly with the anomaly detection system 104, bypassing the network 112.

As mentioned above, the anomaly detection system 104 can efficiently and more flexibly determine operation anomalies within time-series data. At a broader level, such anomaly detection can improve drilling optimization models by accelerating well construction learning rates and improving drilling operation consistency. For example, anomaly detection supports drilling optimization models to automatically measure and visualize contextualized invisible lost time and propose corrective actions. In addition, anomaly detection as disclosed herein provides drilling optimization models with feature extraction for procedural adherence compliance and standardization of optimal operation processes. Further, anomaly detection supports drilling optimization models providing integrated well construction intervention, feedback strategy for certain operation states, and remote monitoring of drilling optimization workflows (e.g., for integrated well construction). In accordance with one or more such embodiments, FIG. 2 illustrates an overview of a drilling optimization model determining operation anomalies.

Figure 2:
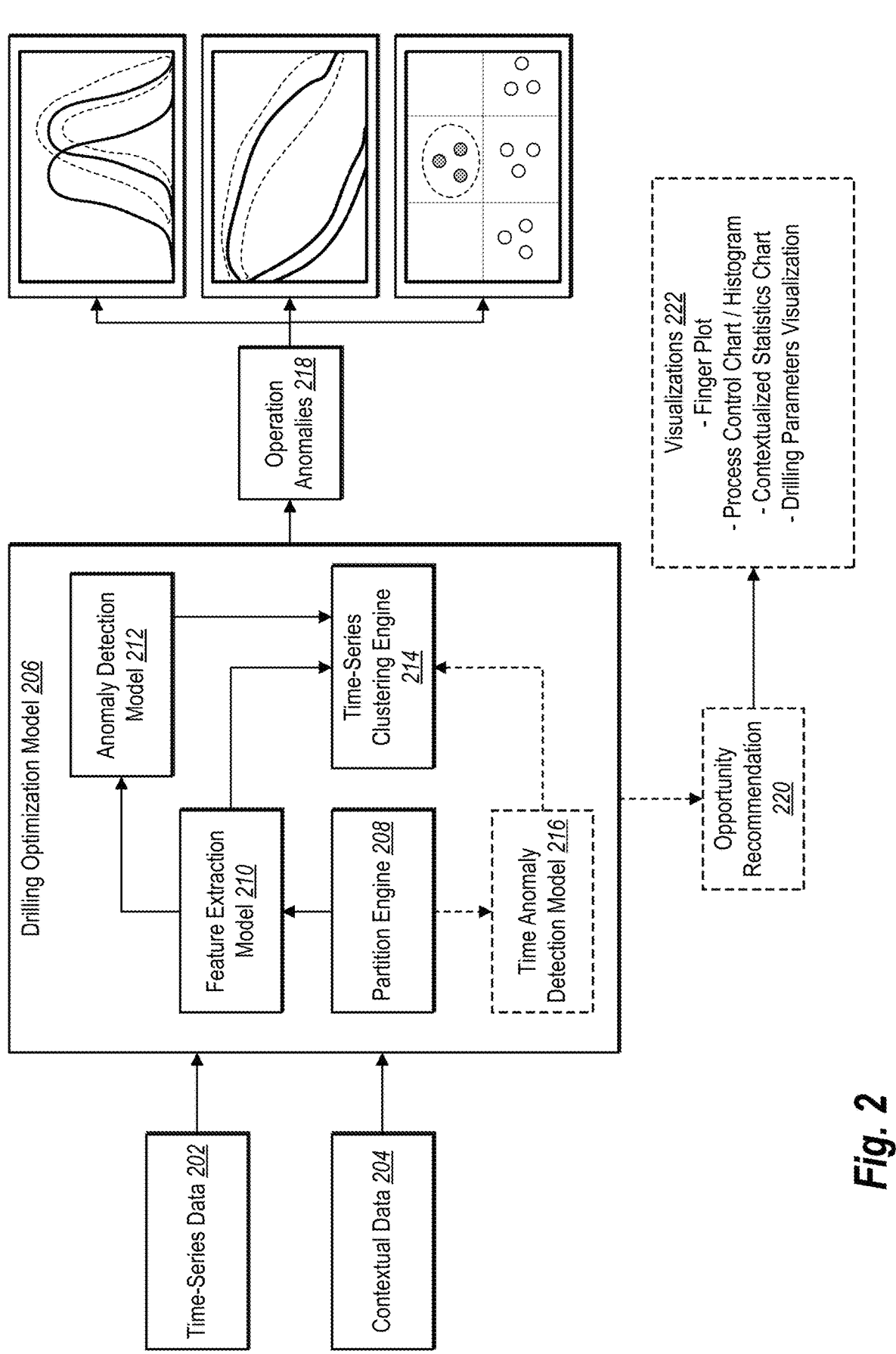
FIG. 2 illustrates an overview of a drilling optimization model determining operation anomalies in accordance with one or more embodiments.

For example, as shown in FIG. 2, a drilling optimization model 206 identifies time-series data 202. In one or more embodiments, the time-series data 202 comprises high-frequency drilling providing operational granularity for one or more drilling operations. For example, the time-series data 202 comprises raw sensor data corresponding to one or more sensors tracking operation of subterranean drilling equipment.

Additionally shown, the drilling optimization model 206 identifies contextual data 204, such as a daily drilling report (DDR). For example, the contextual data 204 may include a report date, a report number, a well name or identifier (e.g., an American Petroleum Institute number), a job name, contractor information, an authorization for expenditure number, a field or geographical area, lease information, elevation, rotary Kelly bushing (e.g., a height of the Kelly bushing from ground level), a spud date, days from spud, measured depth, true vertical depth, 24-hr footage (e.g., a difference in measured depth from the previous day), hours drilling, present operations, operators on shift, planned activities or operation states, etc. It will be appreciated that the contextual data 204 can include myriad other elements, such as a bottom-hole assembly, drilling fluid, geological formation, and the like.

Based on the time-series data 202 and the contextual data 204, the drilling optimization model 206 performs a series of acts utilizing one or more engines or computer models. For example, a partition engine 208 splits the time-series data 202 into various data buckets. To illustrate, the partition engine 208 splits the time-series data 202 according to one or more categories of the contextual data 204, such as operation state, bottom hole assembly, or casing strings.

Based on the partitioned time-series data, a feature extraction model 210 determines a variety of operation features describing aspects of one or more drilling operations. For example, the feature extraction model 210 determines operation features based on feature signals like velocity, acceleration, time, position, direction, range, count, etc. Examples of such operation features (e.g., for a traveling block) include maximum up velocity at time x, leading stationary time, minimum height, total direction change count, duration, total down time, maximum up acceleration, etc.

For each of the extracted operation features, an anomaly detection model 212 determines feature probabilities. Subsequently, the anomaly detection model 212 uses the feature probabilities to determine operation anomalies 218. In particular embodiments, the anomaly detection model 212 uses the methodology that reinforced events ($p \geq \varepsilon$) are common, and rare events ($p < \varepsilon$) constitute an anomaly (e.g., stacked operation feature curves in a common configuration versus outlier feature curves in an uncommon configuration). For example, the anomaly detection model 212 determines the operation anomalies 218 by comparing the feature probabilities to an anomaly threshold. Based on one or more feature probabilities satisfying the anomaly threshold, the anomaly detection model 212 can determine that a portion of the time-series data 202 corresponds to an operation anomaly. Moreover, as will be described below, the anomaly detection model 212 identifies the operation anomalies 218 by indicating which operation feature(s) contribute to the operation anomaly.

Further shown in FIG. 2, a time-series clustering engine 214 uses the extracted features to generate clusters of operation feature curves that represent one or more feature signals. In particular embodiments, the time-series clustering engine 214 determines a number of clusters for the operation feature curves. Additionally, in one or more embodiments, the time-series clustering engine 214 renders the operation feature curves for display in a particular configuration of clusters based on operation features identified as anomalous. For instance, the time-series clustering engine 214 generates anomalous operation feature curves in a first color and non-anomalous operation feature curves in a second color (e.g., for a visual, user-friendly interpretation of the operation anomalies 218). In additional or alternative embodiments, the time-series clustering engine 214 generates clusters of operation feature curves by utilizing time anomaly data from a time-anomaly detection model 216.

In one or more embodiments, the time-anomaly detection model 216 uses partitioned time-series data to determine anomalies based on time and certain statistical constraints. For example, the time-anomaly detection model 216 uses process control limits of upper and lower bounds based on normal process variation to identify anomalies as a function of time. As another example, the time-anomaly detection model 216 uses histogram or frequency distribution to determine time-based anomalies of partitioned time-series data.

In certain embodiments, the drilling optimization model 206 generates an opportunity recommendation 220. For example, the drilling optimization model 206 determines an amount of lost time or lost opportunity (e.g., lost revenue, lost drilling time, quantifiable inefficiencies, etc.) due to the operation anomalies 218. Then, based on the amount of lost time or opportunity, the drilling optimization model 206 determines corrective actions for reducing the amount of lost time or opportunity going forward. These corrective actions may take the form of recommendations to stop a particular drilling operation, standardize or train operators on a particular drilling operation, replace an operator, use a different bottom hole assembly, switch drilling fluids, and the like.

In one or more embodiments, the drilling optimization model 206 generates visualizations 222. The visualizations 222 may include anomaly visualizations corresponding to the operation anomalies 218. In other embodiments, the visualizations 222 comprises one or more of a variety of different graphical depictions corresponding to the opportunity recommendation 220. For example, the visualizations 222 may include a finger plot, a process control chart or histogram, contextualized statistics, or drilling parameters. Like the operation anomalies 218, the drilling optimization model 206 can also surface the visualizations 222 to a graphical user interface of an implementing client device.

As mentioned previously, the anomaly detection system 104 can utilize a feature extraction model together with an anomaly detection model to efficiently and flexibly identify operation anomalies. FIG. 3 illustrates the anomaly detection system 104 identifying an operation anomaly in accordance with one or more embodiments. For example, at an act 302, the anomaly detection system 104 identifies time-series data for subterranean drilling equipment. In particular, at the act 302, the anomaly detection system 104 identifies time-stamped or chronological data (e.g., that corresponds to hookload, block position, revolutions per minute, pump flowrate, etc.). In certain implementations, the act 302 comprises identifying sensor data from one or more sensors tracking the chronological data of the subterranean drilling equipment. For instance, the anomaly detection system 104 may receive raw sensor data from the one or more sensors in real-time as the sensors detect or measure certain values during operation of the subterranean drilling equipment. In other instances, the anomaly detection system 104 receives sensor data in real-time (or near real-time) from a third-party server designated for gathering and relaying sensor data.

At an act 304, the anomaly detection system 104 generates operation features defining operation of the subterranean drilling equipment over time. In one or more embodiments, the anomaly detection system 104 generates the operation features by partitioning the time-series data (e.g., according to operation states and/or other contextual data). Additionally, in certain embodiments, the anomaly detection system 104 filters the time-series data to estimate feature signals like velocity, acceleration, time, position, direction, range, count, etc. of the subterranean drilling equipment. Moreover, the anomaly detection system 104 can extract operational features that include particular values or attributes from the estimated feature signals, such as maximum up velocity at time x, leading stationary time, minimum height, total direction change count, duration, total down time, maximum up acceleration, etc.

At an act 306, the anomaly detection system 104 generates feature probabilities for the operation features. In one or more embodiments, the anomaly detection system 104 generates the feature probabilities by converting discrete feature data (e.g., histograms) representing the operation features into continuous data for probability estimation. For example, the anomaly detection system 104 determines probability density functions for each discrete feature dataset using one or more non-parametric models. In turn, the anomaly detection system 104 can determine a feature probability for each operation feature (e.g., as depicted in the act 306 of FIG. 3).

At an act 308, the anomaly detection system 104 identifies an anomaly of one or more drilling operations (e.g., as captured in the time-series data) of the subterranean drilling equipment based on the feature probabilities. In particular embodiments, the anomaly detection system 104 identifies an anomaly by comparing the feature probabilities to an anomaly threshold. For example, the anomaly detection system 104 determines whether one or more of the feature probabilities fall below the anomaly threshold. If so, the anomaly detection system 104 identifies the one or more feature probabilities as anomalous.

Figure 4A:
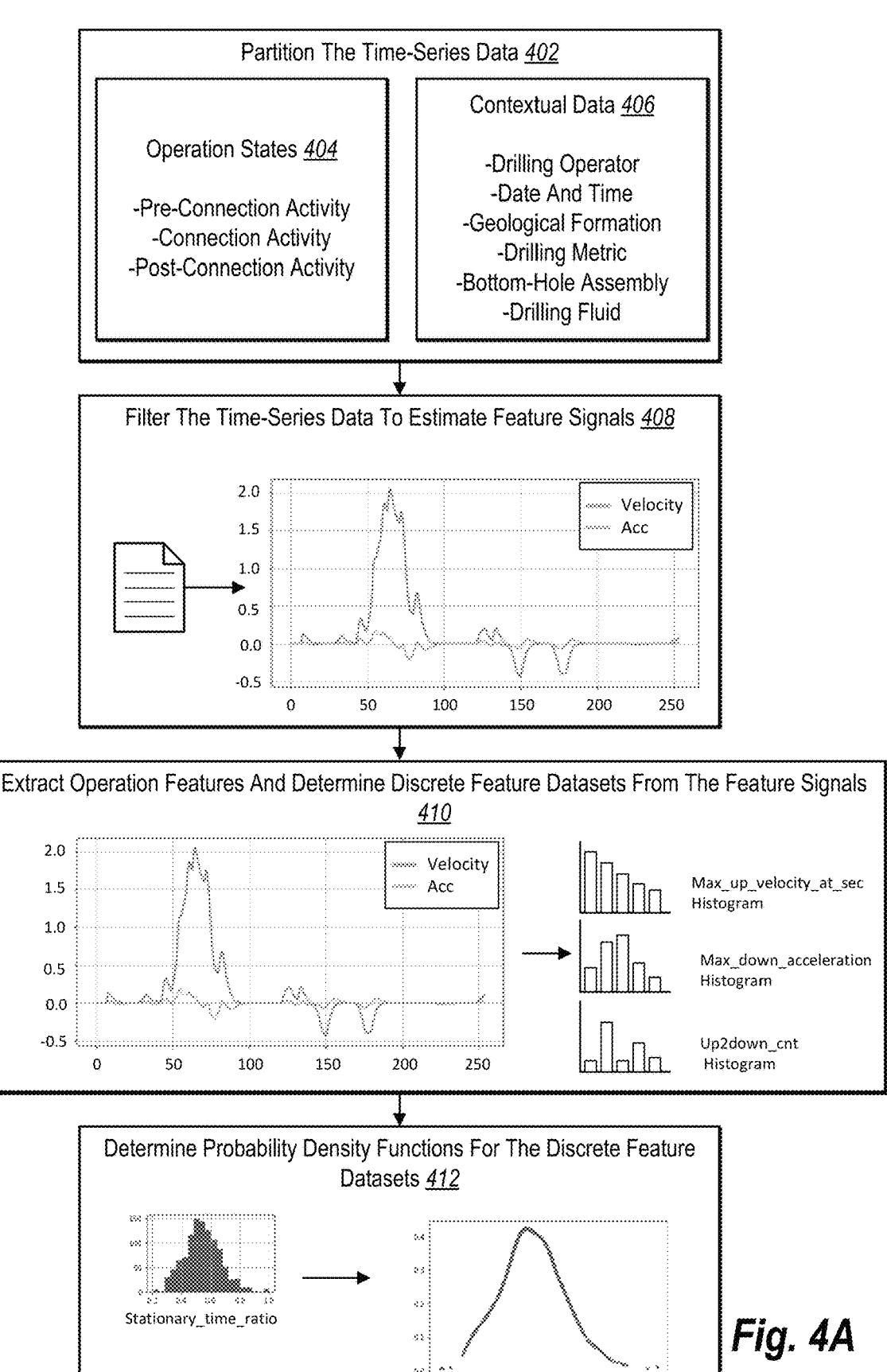
FIGS. 4A-4B illustrate an anomaly detection system identifying operation anomalies and presenting an anomaly visualization for display in accordance with one or more embodiments.
Figure 4B:
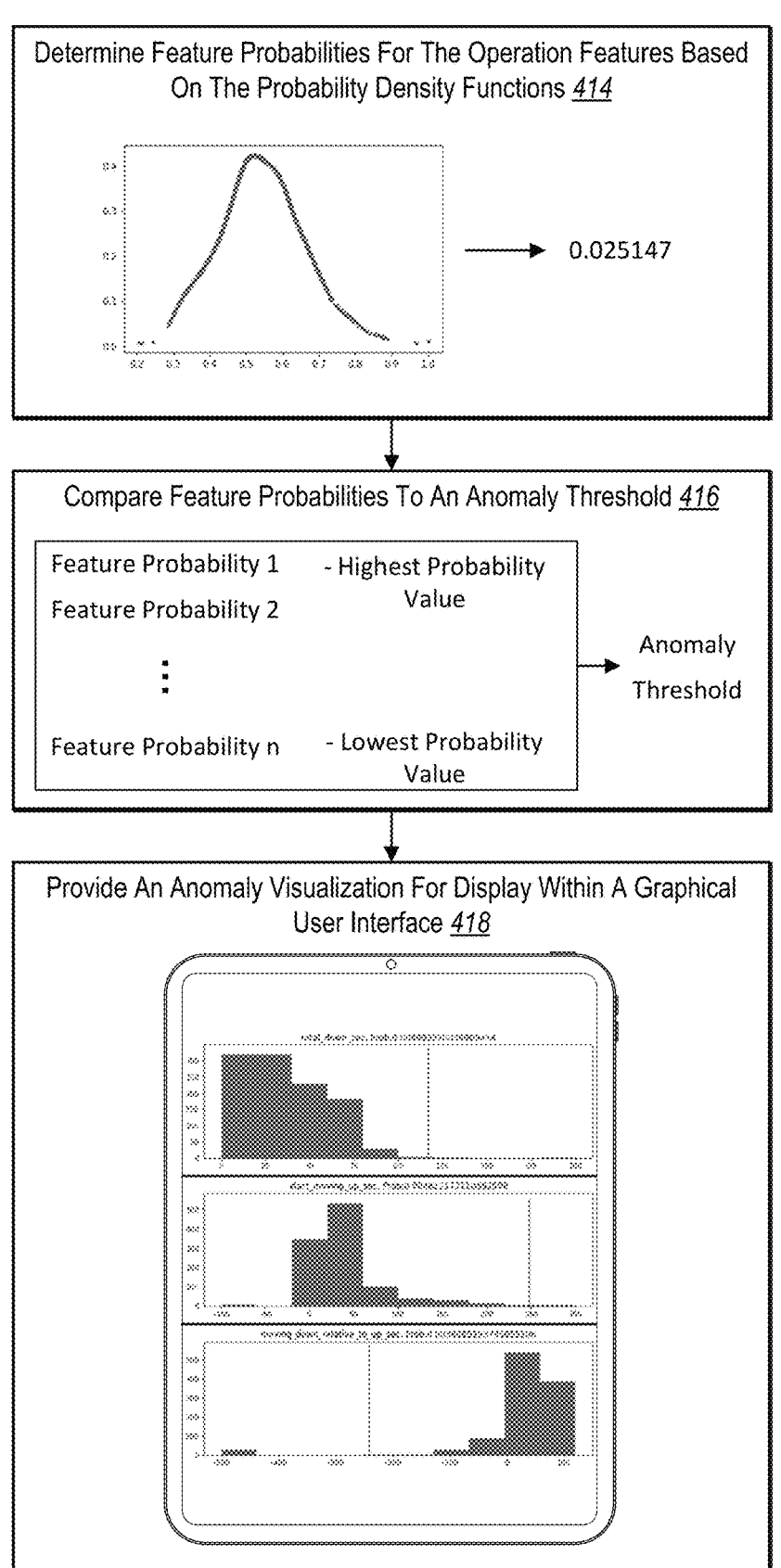

As discussed briefly above, the anomaly detection system 104 can efficiently identify anomalies within time-series data and provide easily interpretable anomaly visualizations for display. FIGS. 4A-4B illustrate the anomaly detection system 104 identifying operation anomalies and presenting an anomaly visualization for display in accordance with one or more embodiments. For example, as shown at an act 402 in FIG. 4A, the anomaly detection system 104 partitions time-series data to determine particular data buckets or portions of the time-series data. In certain embodiments, the anomaly detection system 104 partitions the time-series data according to operation states 404 and/or contextual data 406.

To illustrate, the anomaly detection system 104 splits the time-series data according to one or more of the operation states 404, such as pre-connection activities that relate to drilling off, moving a drill string to a connection point, and stopping rotation and pumps. Additionally, or alternatively, the anomaly detection system 104 splits the time-series data according to other of the operation states 404, such as connection activities that relate to assembling a drill string or post-connection activities that relate to drilling, tripping pipe, and/or processes occurring from removing slips until the drill bit is on bottom.

In a similar fashion, the anomaly detection system 104 can split the time-series data according to the contextual data 406 such as drilling operator, date and time, geological formation, drilling metric, bottom hole assembly, drilling fluid. The anomaly detection system 104 can also use other types of contextual data to partition the time-series data. For example, the anomaly detection system 104 can split the time-series data by information included within a DDR (as discussed above) or event-based information (such as bit trip, twist off, mud motor failure, etc.).

In certain embodiments, after splitting the time-series data based on a first category, the anomaly detection system 104 can again split the time-series data according to a second category of the operation states 404 or the contextual data 406 for an increased level of granularity. For example, the anomaly detection system 104 can split the time-series data again by drilling stand, tripping in and out of the drill-well, etc. In one or more embodiments, the anomaly detection system 104 can further iterate partitioning steps for different categories of the operation states 404 or the contextual data 406 as may be desired. Further details of partitioning the time-series data are described in U.S. Provisional Application No. 63/199,293, filed on Dec. 18, 2020, entitled SIMILARITY AND ANOMALY RECOGNITION IN DRILLING OPERATIONS, the entire contents of which are expressly incorporated herein by reference.

At an act 408, the anomaly detection system 104 filters the partitioned time-series data to estimate feature signals. In one or more embodiments, filtering the time-series data includes smoothing the time-series data to suppress abrupt changes or data spikes (e.g., from random noise). Moreover, in certain embodiments, the anomaly detection system 104 filters the time-series data in a manner that reduces or minimizes a temporal lag (e.g., to avoid undesirable control dynamics with the subterranean drilling equipment). Therefore, in particular embodiments, the anomaly detection system 104 uses a zero-lag Difference of Gaussian (DoG) filter to filter the time-series data. Additionally, in some instances, the anomaly detection system 104 uses less than a full filter. For example, the anomaly detection system 104 can use half of the zero-lag DoG filter defined in the temporal domain (but not in the spatial domain) such that a maximum value that is positive decreases to a minimum value that is negative and then increases to a value of approximately zero (e.g., in an asymptotic manner).

In one or more embodiments, the anomaly detection system 104 utilizes a zero-lag DoG filter in the temporal domain based on Algorithm 1 reproduced below:

---

Algorithm 1 Calculate a ZL-DoG filter in temporal domain

1: procedure ZLDoG(Window Size: $t_w$)
2:    $\sigma_n \leftarrow t_w/4$
3:    $\sigma_p \leftarrow \sigma_n/4$
4:    $t \leftarrow [0,...,t_w - 1]$
5:    $G_p \leftarrow \text{Gaussian}(\sigma_p, t)$
6:    $G_n \leftarrow \text{Gaussian}(\sigma_n, t)$ 7: $$k \leftarrow \left(\frac{\sigma_n}{\sigma_p}\right)\left(\frac{1 + \sigma_p\sqrt{2\pi}}{1 + \sigma_n\sqrt{2\pi}}\right)$$

8:    $F \leftarrow G_p - k \cdot G_n$
9:    $n \leftarrow 0$
10:   for $t = 0 \rightarrow t_w - 1$ do
11:     $n \leftarrow n + F(t_w - t) \cdot t$
12:   $Z \leftarrow F/n$
13:   return $Z$

---

In one or more embodiments, the anomaly detection system 104 uses a normalized filter and a window size of 256 samples with various constants such as k=1.0185 and N=19.62 for a signal of sample rate at 1 Hz.

It will be appreciated that the anomaly detection system 104 can use additional or alternative types of filters at the act

408. For example, in certain implementations, the anomaly detection system 104 uses a differential quotient, finite difference approximators, a Savitzky-Golay filter, or Laplacian of Gaussians (LoG). Similarly, in one or more embodiments, the anomaly detection system 104 can utilize a filter defined in the spatial domain (e.g., where depth may be measured depth, total vertical depth, etc.). Further details of the various algorithms and/or filters used to filter the time-series data are provided in International Application No. PCT/US2018/037680, filed on Jun. 15, 2018, entitled DYNAMIC FIELD OPERATIONS SYSTEM, the entire contents of which are expressly incorporated herein by reference.

Based on filtering the time-series data, the anomaly detection system 104 estimates certain feature signals. For example, the anomaly detection system 104 generates filtered digital signals that indicate a variety of waveform peaks and troughs, slopes, concavity, coordinate positioning, and/or other digital signal patterns or values. These digital signals or waveforms quantitively represent feature signals like velocity, acceleration, time, position, direction, range, count, etc. of the subterranean drilling equipment.

At an act 410, the anomaly detection system 104 extracts operation features and determines discrete feature datasets from the feature signals. In particular embodiments, the anomaly detection system 104 determines certain values from the feature signals (e.g., velocity values as a function of time, a maximum acceleration value, up-movement counts to down-movement counts, etc.). For example, the anomaly detection system 104 samples values from the feature signals at particular intervals of time, count, etc. In certain cases, the anomaly detection system 104 samples a value from the feature signals at each interval or frequency of time, count, etc. (e.g., according to the intervals or sampling frequency of the time-series data).

Additionally, or alternatively, the anomaly detection system 104 samples values from the feature signals based on the waveform pattern or structure. For example, the anomaly detection system 104 samples values from the feature signals at peaks (e.g., local peaks or absolute peaks) or at troughs (e.g., local troughs or absolute troughs). As additional examples, the anomaly detection system 104 samples values from the feature signals based on certain qualities or attributes of a waveform, such as a threshold slope, concavity, position at a threshold time, etc.

In certain embodiments, the anomaly detection system 104 modifies values from the feature signals to extract an operation feature. For example, the anomaly detection system 104 combines values from the feature signals to determine ratios. As additional examples, the anomaly detection system 104 normalizes values, converts values to a code or identifier, and the like.

Based on the determined values, the anomaly detection system 104 generates corresponding discrete feature datasets. In other words, for block position, the anomaly detection system 104 extracts a plurality of features. In one or more embodiments, for block position, the anomaly detection system 104 extracts 28 discrete features. For instance, the anomaly detection system 104 extracts features such as maximum up velocity at time x, maximum up velocity, maximum down velocity at time x, maximum down velocity, maximum up acceleration, maximum down acceleration, moving up ahead down time, maximum height, minimum height, height dynamic range, stationary height average, leading stationary time, minimum height down, maximum distance down, total up time, total down time, total stationary time, start moving up time, start moving down time, moving down relative to up time, up to down count, down to up count, total direction change count, moving up maximum, moving down minimum, moving up down ratio, stationary time ratio, duration of time, etc. It will be appreciated that the anomaly detection system 104 can extract different features for different operation parameters (e.g., that correspond to pump flowrate, pressure, revolutions per minute, etc. instead of block position like those listed above).

At an act 412, the anomaly detection system 104 determines probability density functions for the discrete feature datasets. By determining probability density functions, the anomaly detection system 104 can convert discrete feature datasets to continuous datasets for subsequently estimating feature probabilities (as will be discussed below in relation to act 414). In one or more embodiments, the anomaly detection system 104 determines the probability density functions utilizing a non-parametric model—a model that does not require knowledge or assumptions about the underlying distribution of the discrete feature datasets. For example, the anomaly detection system 104 uses machine-learning models for density estimation such as a decision tree, k-nearest neighbor classifier, or kernel regression. In certain implementations, the anomaly detection system 104 uses the Parzen-window method as described in Raschka to determine the probability density functions. For example, the anomaly detection system 104 uses the Parzen-window method with a Gaussian kernel to determine the probability density functions for the discrete feature datasets according to the following example expression:

$$\hat{f}_h(x) = \frac{1}{n}\sum_{i=1}^{n}K_h(x - x_i) = \frac{1}{nh}\sum_{i=1}^{n}K\left(\frac{x - x_i}{h}\right)$$

where $x_i$ are individual samples of operation feature values, K is a Gaussian kernel, and the operation feature values are normalized by the standard deviation.

Alternatively, at the act 412, the anomaly detection system 104 can utilize different algorithms or models to determine the probability density functions. For example, if the anomaly detection system 104 identifies that a discrete feature dataset corresponds to a particular distribution, the anomaly detection system 104 can implement a distribution-specific algorithm for density estimation. To illustrate, the anomaly detection system 104 can implement a different algorithm (or a combination of algorithms) for determining probability density functions—where the algorithm(s) of choice depend on the discrete feature datasets corresponding to a chi-square distribution, an exponential distribution, an f-distribution, a log-normal distribution, a normal distribution, a t-distribution, a uniform distribution, or a weibull distribution.

In FIG. 4B, at an act 414, the anomaly detection system 104 determines feature probabilities for the operation features based on the probability density functions. For example, the anomaly detection system 104 uses an operation-specific probability density function to estimate a corresponding feature probability of a given operation feature. To illustrate, the anomaly detection system 104 uses a first probability density function for maximum up velocity by time to estimate a probability that the maximum up velocity occurs at time x. Likewise, the anomaly detection system 104 uses a second probability density function for maximum height to estimate a probability that the maximum height is y, and so forth in this manner.

In particular embodiments, the anomaly detection system 104 generates the feature probabilities based on the probability density functions by solving for probability (in each respective probability density function), given an operation feature value. As a result, a determined probability represents the likelihood that the given operation feature falls within an interval (a,b)—or in other terms—the area under its probability density function in the interval (a,b). Therefore, higher probability values are more likely to occur, and lower probability values are less likely to occur.

At act 416, the anomaly detection system 104 compares feature probabilities to an anomaly threshold to identify operation anomalies. For example, the anomaly detection system 104 determines a mean probability of all of the features and then sets a threshold relative to the mean probability. In particular embodiments, the anomaly detection system 104 compares the lowest feature probability for the operation features to the anomaly threshold (e.g., to identify in a binary fashion whether or not a portion of the time-series data includes an anomaly). Additionally, or alternatively, the anomaly detection system 104 compares each of the feature probabilities to the anomaly threshold such that the anomaly detection system 104 can indicate (via an anomaly visualization) each anomalous operation feature contributing to the overall anomaly of the time-series data.

Based on the comparison, the anomaly detection system 104 can determine whether a feature probability satisfies the anomaly threshold. For example, a feature probability satisfies the anomaly threshold (and is therefore anomalous) if the feature probability is less than or equal to the anomaly threshold. As another example, the feature probability satisfies the anomaly threshold if the feature probability is within a certain percentage or range of the anomaly threshold.

Additionally, or alternatively, it will be appreciated that the anomaly detection system 104 can utilize different anomaly thresholds at the act 416. For example, in certain embodiments, the anomaly detection system 104 uses a lower anomaly threshold such that fewer operation features are anomalous. In contrast, the anomaly detection system 104 can use a higher anomaly thresholds such that more operation features are anomalous. In these or other embodiments, the anomaly threshold can include a predetermined or default value. Further, in certain embodiments, the anomaly threshold is a configurable or user-adjustable value. For instance, as shown in relation to FIGS. 7B-7C, the anomaly threshold is adjustable according to user interaction with a user interface element (e.g., an interactive slider).

At an act 418, the anomaly detection system 104 provides an anomaly visualization for display within a graphical user interface (e.g., of an implementing client device). The anomaly visualization comprises an indication of an operation anomaly. For example, the anomaly visualization provides a graphical depiction of the operation anomaly (e.g., a chart, plain text description, a comparison of the feature probability relative to the operation anomaly, etc.). In particular embodiments, the anomaly detection system 104 provides an anomaly visualization that includes an operation feature contributing to the operation anomaly. For instance, as shown in FIG. 4B, the anomaly visualization comprises a histogram of a certain operation feature together with an anomalous value for the operation feature and its corresponding feature probability. In certain implementations, the anomaly detection system 104 generates an anomaly visualization comprising a table or listing of each operation feature and corresponding feature probability (e.g., ranked from highest to lowest probability). In one or more embodiments, the table or listing comprises an anomaly section that details each anomalous operation feature and its anomalous feature probability. For example, act 418 shows that three features contributed to an anomaly. Thus, as shown by in act 418, the anomaly detection system 104 provides not only an indication of an anomaly but the feature(s) that contributed to the anomaly. Knowing the feature(s) contributed to the anomaly allows an end user to deduce what can be done to fix the anomaly or avoid similar anomalies in the future.

Figure 5A:
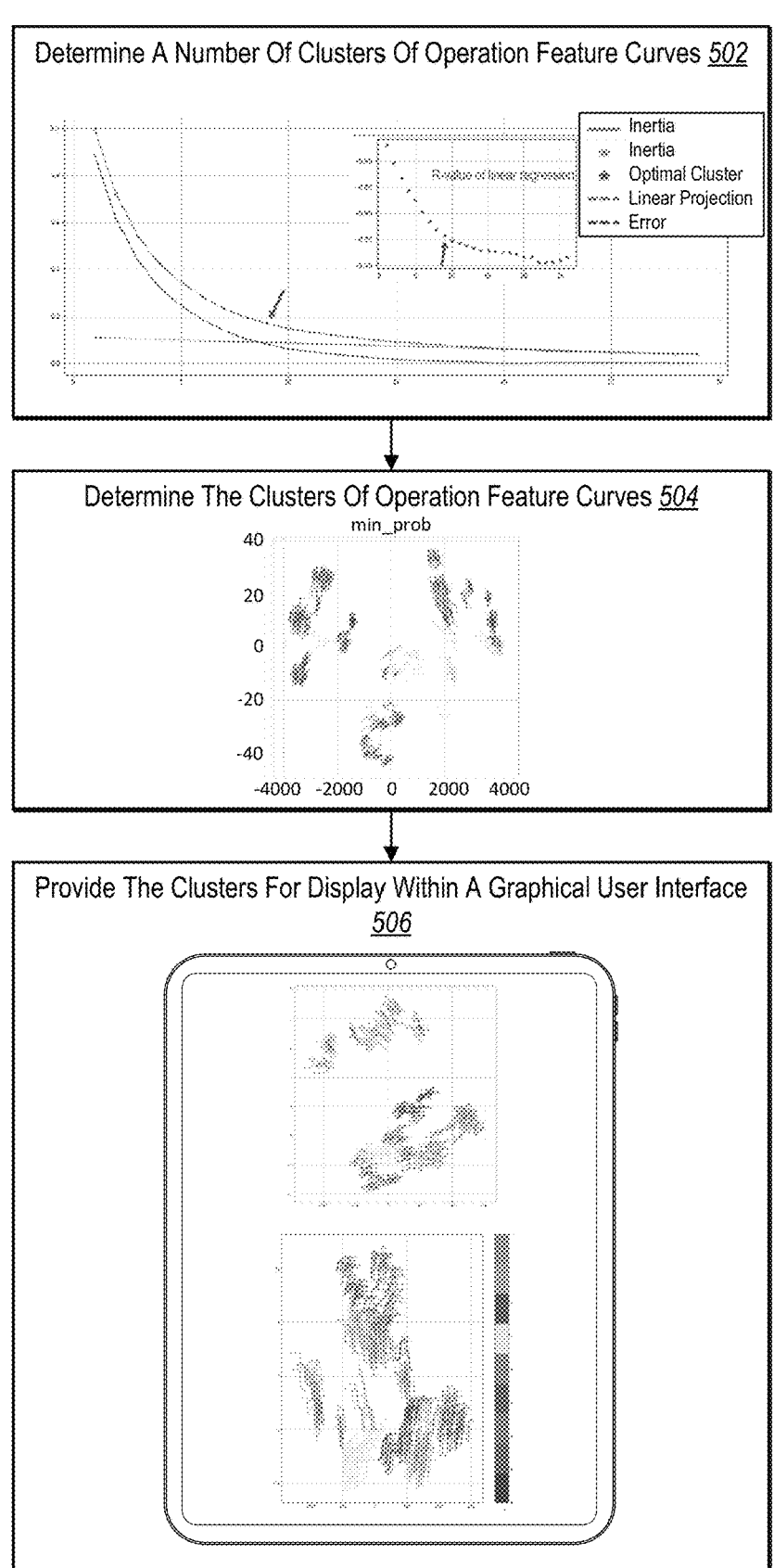
FIGS. 5A-5B illustrate an anomaly detection system providing, for display, one or more graphical user interfaces related to clusters of operation features in accordance with one or more embodiments.
Figure 5B:
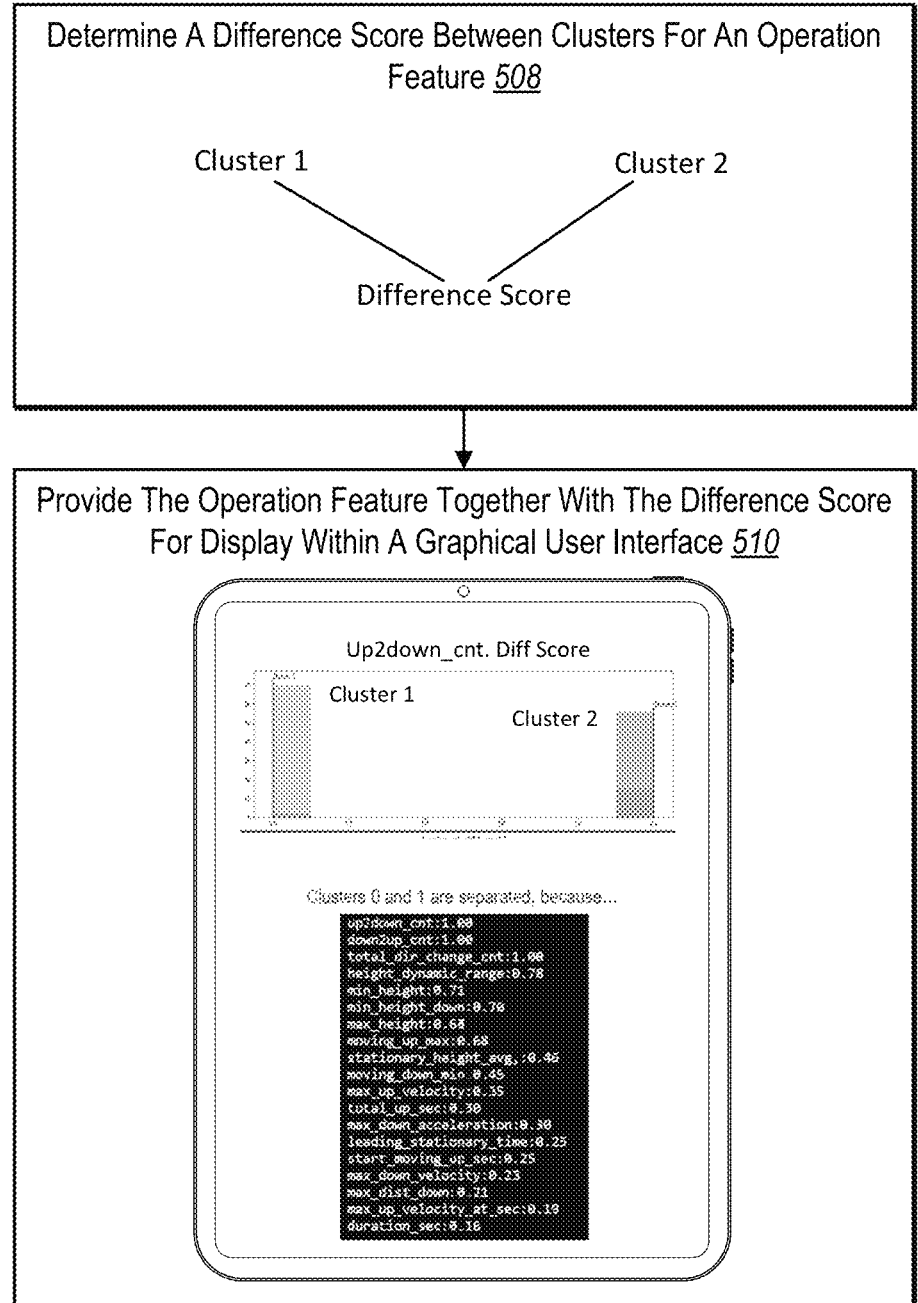

As discussed above, the anomaly detection system 104 can provide more user-friendly graphical user interfaces for improved interpretation of operation anomalies and more visual feature engineering. FIGS. 5A-5B illustrate the anomaly detection system 104 providing, for display, one or more graphical user interfaces related to clusters of operation features in accordance with one or more embodiments. As shown at act 502 in FIG. 5A, the anomaly detection system 104 determines a number of clusters of operation feature curves. The feature curves are the multi-dimensional feature representations of a feature signal (e.g., block position as a function of seconds elapsed). In certain embodiments, the anomaly detection system 104 uses one or more different approaches to determining a number of clusters.

In at least one approach, the anomaly detection system 104 determines a number of clusters of operation feature curves utilizing heuristics to determine a number of clusters that improves a data fit but prevents over-fitting. For example, in certain embodiments, the anomaly detection system 104 utilizes the elbow method. Under the elbow method, the anomaly detection system 104 determines variation as a function of the number of clusters. Based on a plot of the variation, the anomaly detection system 104 selects the number of clusters corresponding to the elbow of the curve plot as the number of clusters to use.

In additional or alternative approaches, the anomaly detection system 104 uses the R-value of linear regression to determine the number of clusters of operation feature curves. For example, the anomaly detection system 104 determines the number of clusters by identifying the cluster number that corresponds to an R-value of 95%. Further, in certain embodiments, the anomaly detection system 104 uses an error threshold to determine the number of clusters of operation feature curves. For instance, the anomaly detection system 104 determines the number of clusters by identifying a cluster number corresponding to an error threshold of 0.1.

At an act 504, the anomaly detection system 104 determines the clusters of operation feature curves (e.g., according to the determined number of clusters). In certain embodiments, the anomaly detection system 104 implements one or more different clustering algorithms to cluster or discriminate the operation feature curves. In one or more embodiments, the anomaly detection system 104 uses a K-means algorithm to cluster the operation feature curves. To perform the K-means clustering algorithm, the anomaly detection system 104 initializes centroids by shuffling the operation feature dataset and then randomly selecting K data points for the centroids without replacement (where K is the number of determined clusters from the act 502). In turn, the anomaly detection system 104 keeps iterating until there is no change to the centroids. For instance, the anomaly detection system 104 determines the sum of the squared distance between data points and all centroids, assigns each data points to the closer cluster (or centroid), and determines the centroids for the clusters by taking the average of all data points that belong to the cluster. It will be appreciated that additional or alternative clustering algorithms can be implemented. For example, in certain implementations, the anomaly detection system 104 uses one or more of affinity propagation, agglomerative clustering, mini-batch K-means, mean shift, spectral clustering, Gaussian mixture model, BIRCH, DBSCAN, OPTICS, etc.

Moreover, in certain implementations, the anomaly detection system 104 determines the clusters of the operation feature curves utilizing only a subset of the operation feature curves. For example, in certain embodiments, the anomaly detection system 104 excludes anomalous operation feature curves and determines the clusters using only non-anomalous operation feature curves. In one or more embodiments, using only non-anomalous feature curves helps to improve accuracy of the determined clusters.

Figure 7A:
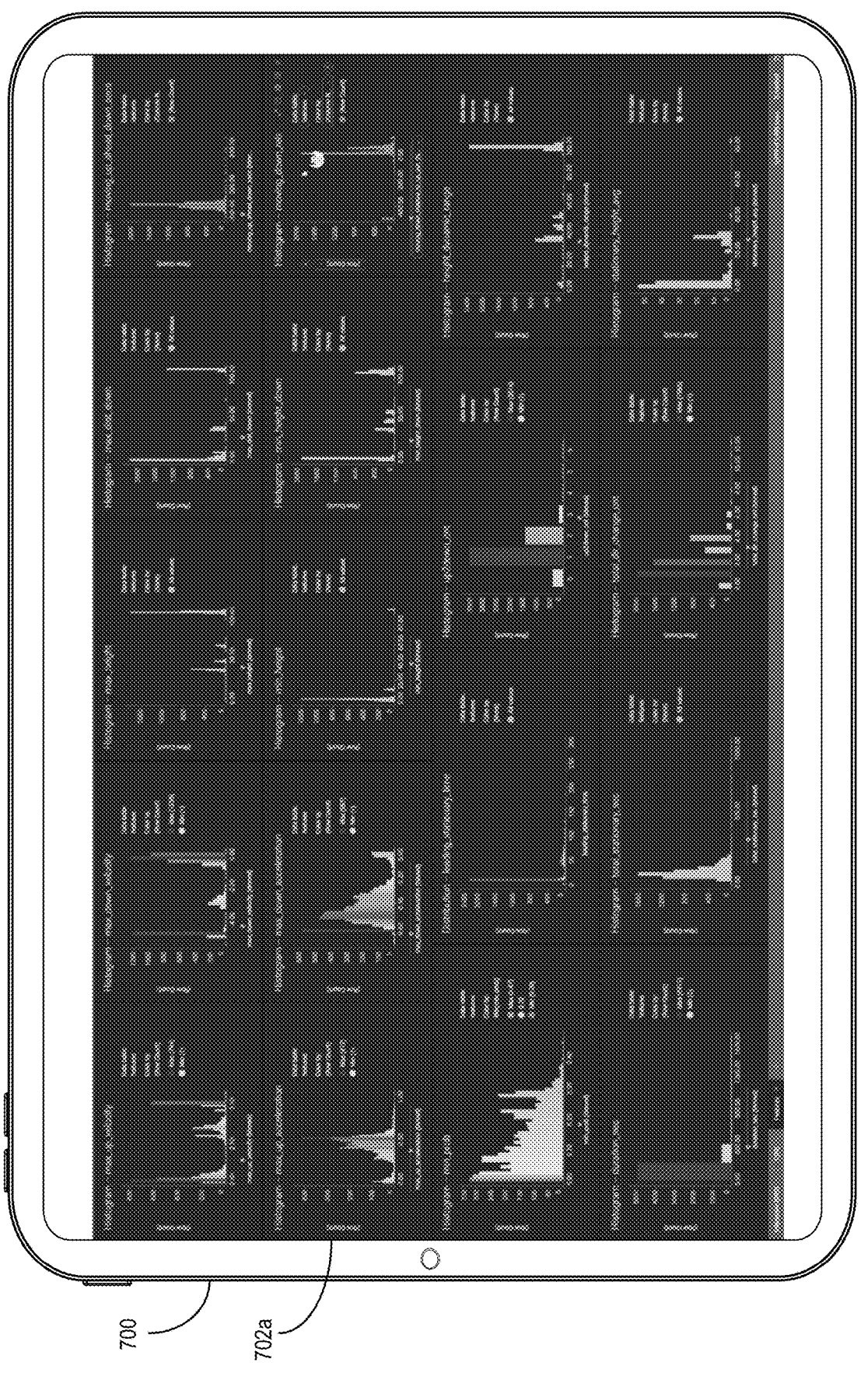
FIGS. 7A-7C illustrate an anomaly detection system providing graphical user interfaces on a computing device for viewing and interacting with operation features and anomaly visualizations in accordance with one or more embodiments.
Figure 7B:
Figure 7C:
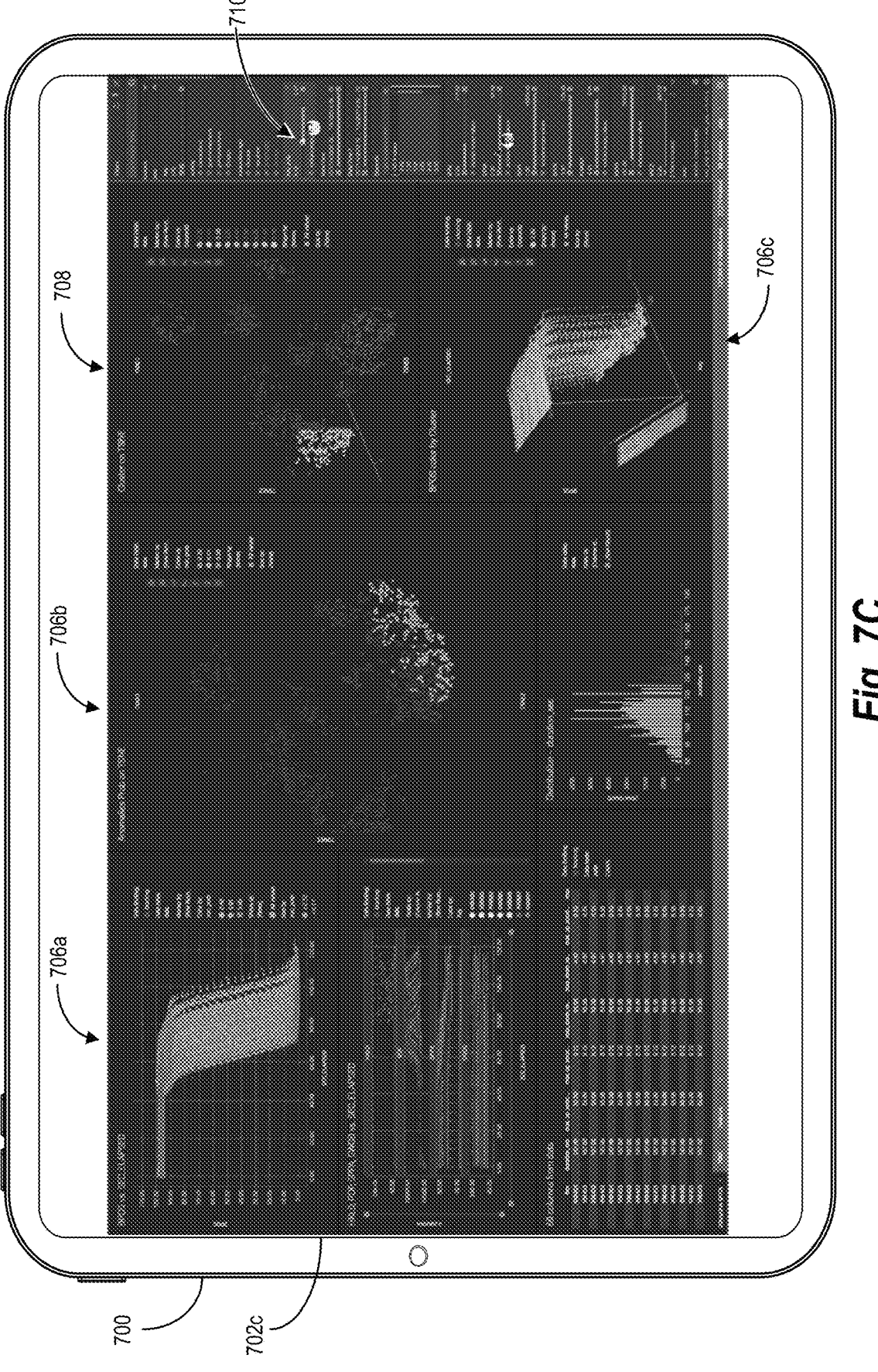

At an act 506, the anomaly detection system 104 provides the clusters for display within a graphical user interface (e.g., as shown in the act 506 of FIG. 5A or in FIGS. 7A-7C). In particular embodiments, the anomaly detection system 104 provides graphical depictions of the clusters relative to each other (e.g., within a two-dimensional or three-dimensional T-SNE plot). For example, as depicted in the act 506, the anomaly detection system 104 projects operation feature curves (e.g., of various length) for block position into a two-dimensional T-SNE feature space. The location of the operation feature curves depends on the value of the operation feature. In certain implementations, the anomaly detection system 104 utilizes different color codings or heat maps to differentiate between different clusters or represent certain operation states or contextual data (e.g., hour of the day or hole depth). Additionally, or alternatively, the anomaly detection system 104 utilizes different graphical configurations (e.g., coloring or pattern) to distinguish anomalous operation feature curves from non-anomalous feature curves.

In FIG. 5B, at an act 508, the anomaly detection system 104 determines a difference score between clusters corresponding to an operation feature. In certain embodiments, the anomaly detection system 104 determines difference scores utilizing one or more different approaches. For example, in one or more embodiments, the anomaly detection system 104 compares an average value for one cluster of operation feature curves and an average value for another cluster of operation feature curves. Accordingly, in particular embodiments, the difference score comprises a difference of averages. In other embodiments, the anomaly detection system 104 determines difference scores between clusters utilizing different types of operation feature values, such as ranges, medians, standard deviations, linear fit, exponential fit, or other statistical measure.

At an act 510, the anomaly detection system 104 provides the operation feature together with the difference score for display within a graphical user interface. In particular embodiments, the anomaly detection system 104 presents a graphical depiction of certain clusters for an operation feature (e.g., multiple clusters of operation feature curves relative to each other). In certain implementations, the anomaly detection system 104 renders the clusters in one or more different forms, such as a histogram, scatter plot, etc. Additionally, or alternatively, the anomaly detection system 104 shows an average value (or other statistical measure) for each cluster.

Moreover, in one or more embodiments, the anomaly detection system 104 surfaces a difference score between the clusters (e.g., as shown in the act 510 of FIG. 5B depicting a difference score of 1.0 between "Cluster 1" and "Cluster 2" for the operation feature "up2down_cnt"). In certain implementations, the anomaly detection system 104 further presents a table or chart indicating a difference score between two or more particular clusters for a certain operation feature (or multiple operation features as shown in the act 510 of FIG. 5B).

Accordingly, the anomaly detection system 104 can improve interpretability by avoiding "black-box" type of analyses that provide little value for feature engineering or parameter extraction. Instead, the anomaly detection system 104 can indicate, via a graphical user interface, why two given clusters are separate and the extent of the separation. Furthermore, in one or more embodiments, the clustering in the feature space, as described above in relation to FIGS. 5A-5B, can provide a check that the features extracted are relevant.

Figure 6A:
FIGS. 6A-6C illustrate experimental results of implementing an anomaly detection system to generate anomaly visualizations in accordance with one or more embodiments.
Figure 6B:
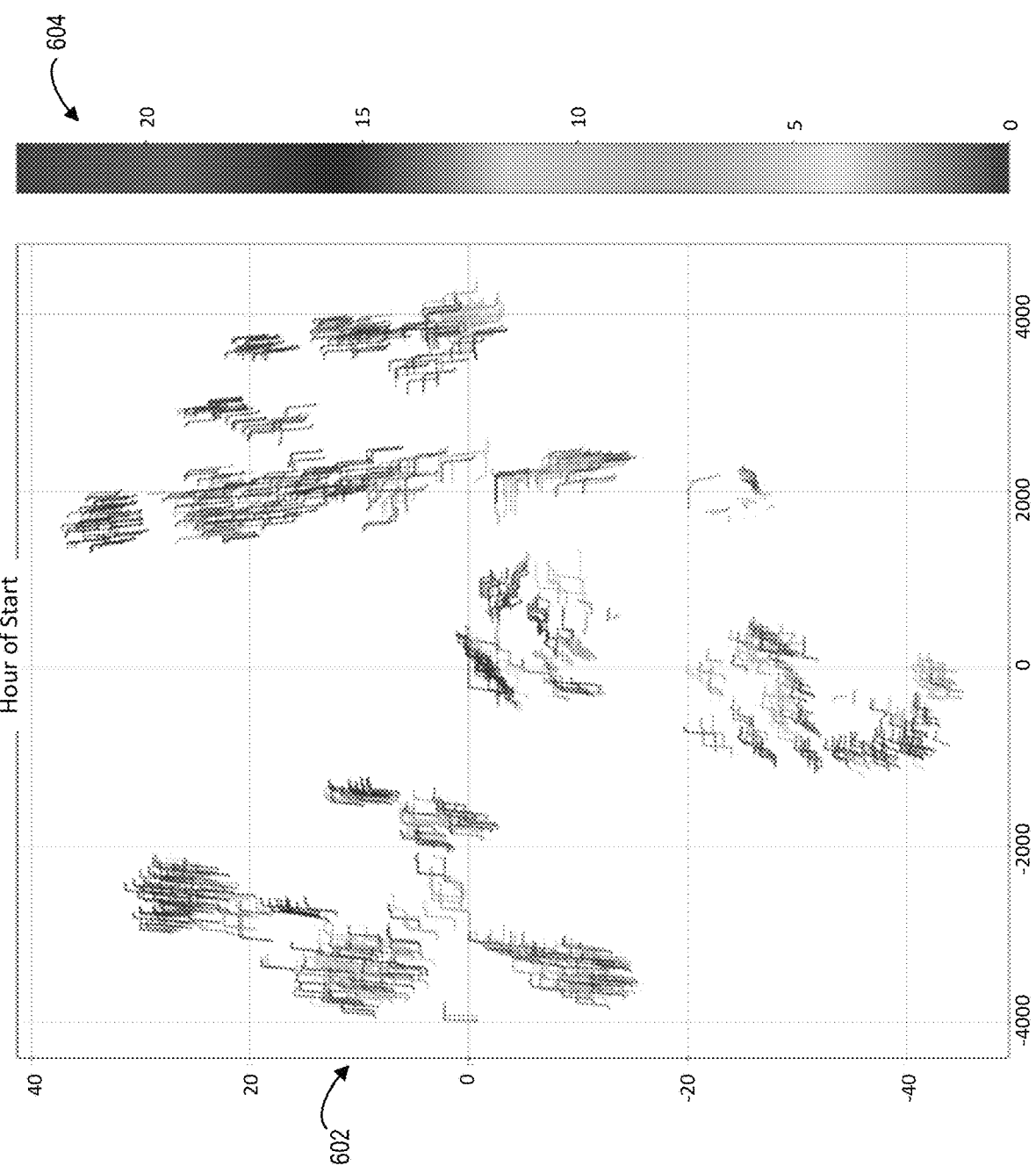
Figure 6C:
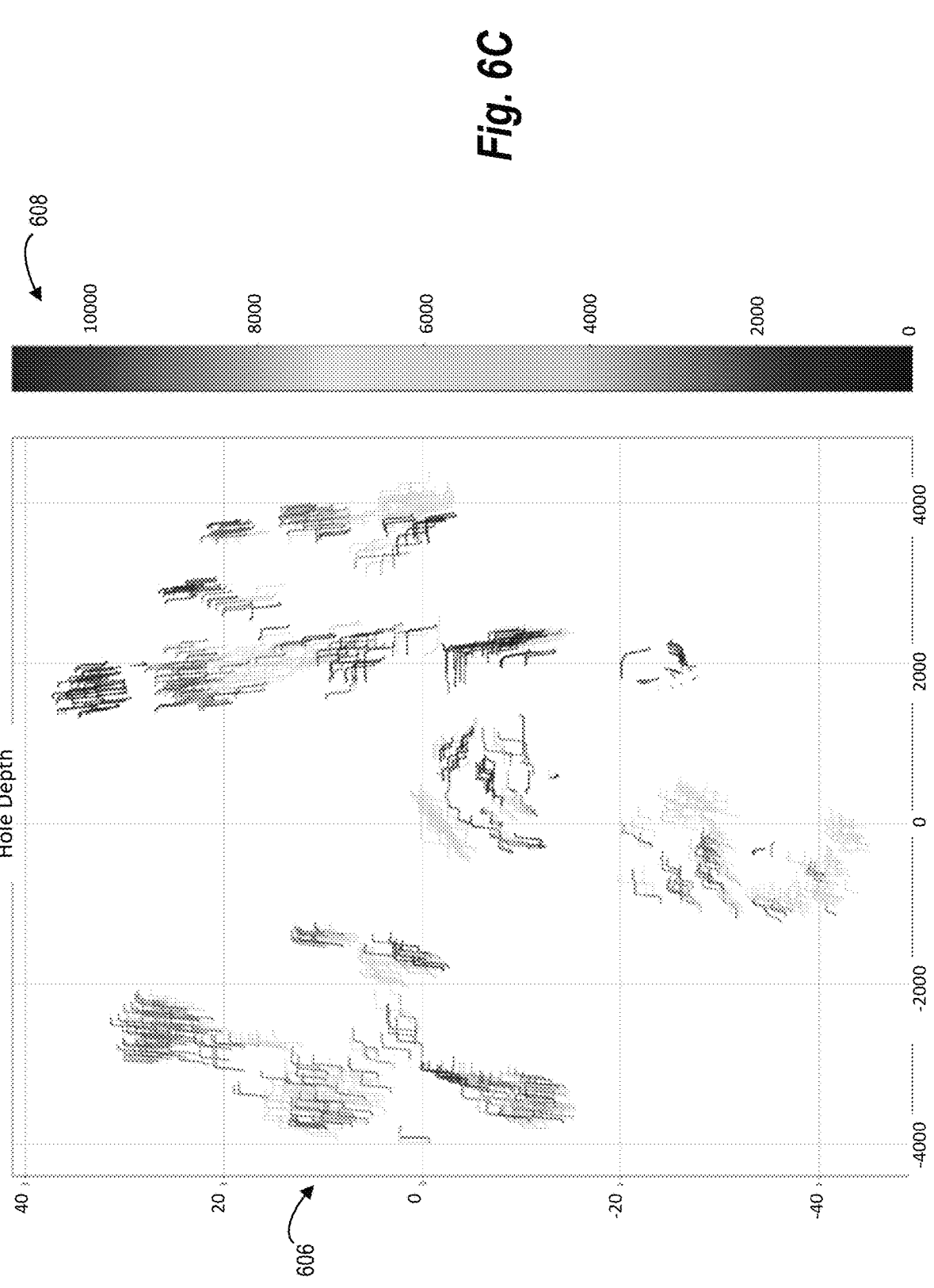

As mentioned above, the anomaly detection system 104 can present anomaly visualizations for enhanced user-interpretability. FIGS. 6A-6C illustrate experimental results of implementing an anomaly detection system to generate anomaly visualizations in accordance with one or more embodiments. As shown in FIG. 6A, the anomaly detection system 104 generates an anomaly visualization 600. The anomaly visualization 600 comprises an arrangement of clusters of operation feature curves (e.g., for block position). To generate such an arrangement of clusters, the anomaly detection system 104 dynamically determines a number of clusters for the operation feature curves, determines the actual clusters of operation feature curves, and generates the clusters for display as described above in relation to FIG. 5A.

Moreover, the anomaly visualization 600 shows how some operation feature curves are tightly clustered, and even overlapping in certain areas. These operation feature curves represent common curves (or non-anomalous curves). In addition, the anomaly visualization 600 shows some operation feature curves that are distanced further away from a particular cluster, not overlapping other operation feature curves, etc. These operation feature curves represent anomalous operation feature curves.

Similarly, the anomaly visualization 600 shows interrelationships between clusters of operation feature curves. For example, one cluster may correspond to maximum velocity down for an oil-based drilling mud, and another cluster may correspond to maximum velocity down for a water-based drilling mud. In this manner, the anomaly detection system 104 can identify and visually depict discrepancies between clusters of operation feature curves—thereby lending to increased interpretability.

FIG. 6B similarly shows the anomaly detection system 104 generating an anomaly visualization 602 for display. In particular, the anomaly visualization 602 comprises the same clusters of operation feature curves as represented in the anomaly visualization 600 of FIG. 6A. However, different from FIG. 6A, the anomaly visualization 602 in FIG. 6B further comprises a heat map 604. The heat map 604 provides a color coding or mapping of color to visually indicate an additional attribute (e.g., "Hour of Start"). That is, the anomaly detection system 104 depicts the clusters of operation feature curves for a particular operation feature extracted from time-series data partitioned according to the contextual data "Hour of Start." To do so, the anomaly detection system 104 uses the heat map 604 to show a temporal element of 0-24 by color code to indicate a time of start for a given operation feature curve (e.g., for maximum velocity down).

As another example, FIG. 6C also shows the anomaly detection system 104 generating an anomaly visualization 606 for display—where the anomaly visualization 606 includes the same clusters of operation feature curves as the anomaly visualizations 600, 602. In this case, FIG. 6C shows yet another attribute (e.g., "Hole Depth"). Accordingly, the anomaly detection system 104 generates the operation feature curves with color indicated in a heat map 608 representing depth from approximately zero to above 10,000 (e.g., feet or meters). It will be appreciated that the anomaly detection system 104 can generate anomaly visualizations representing clusters of operation feature curves according to myriad other types of contextual data, operation states, etc. In this manner, the anomaly detection system 104 can provide anomaly visualizations with multiple facets of visual information to easily draw conclusions between clusters of operation feature curves.

As discussed above, the anomaly detection system 104 can provide anomaly visualizations for display within graphical user interfaces for intuitive user interaction and interpretation. FIGS. 7A-7C illustrate the anomaly detection system 104 providing graphical user interfaces on a computing device 700 for viewing and interacting with operation features and anomaly visualizations in accordance with one or more embodiments. For example, as shown in FIG. 7A, the anomaly detection system 104 provides a user interface 702a for display at the computing device 700. The user interface 702a comprises graphical depictions of the operation features extracted from time-series data.

To generate the user interface 702a for display, the anomaly detection system 104 performs a series of acts as described above in relation to FIG. 4A. For example, the anomaly detection system 104 partitions time-series data (e.g., according to operation states, contextual data, or a combination of both). In addition, the anomaly detection system 104 filters the time-series data to estimate feature signals (e.g., utilizing a zero-lag DoG filter). In turn, the anomaly detection system 104 extracts operation features and determines the discrete feature datasets shown in FIG. 7A.

In response to user navigation (e.g., a navigation tab at bottom of page), the anomaly detection system 104 provides a user interface 702b as shown in FIG. 7B. The user interface 702b comprises anomaly visualizations 706a-706c, a feature curve representation 708, and an anomaly threshold slider 710 (among other elements). For example, in response to user selection of a portion of one or more clusters in the feature curve representation 708, the anomaly detection system 104 populates the anomaly visualizations 706a-706c. Like the anomaly visualizations discussed above in relation to FIGS. 6A-6C, the anomaly visualizations 706a-706c in FIG. 7B depict operation feature curves (or dots, depending on dimensionality or feature space).

Moreover, the anomaly visualizations 706a-706c depict operation feature curves that include both anomalous operation feature curves and non-anomalous operation feature curves. Specifically, the anomaly threshold slider 710 is set to a low or minimum value (e.g., zero). Therefore, the anomaly detection system 104 generates the anomaly visualizations 706a-706c to include many (if not all) anomalous operation feature curves along with non-anomalous operation features curves because the corresponding feature probabilities exceed the anomaly threshold.

Subsequently, in response to user interaction with the anomaly threshold slider 710, the anomaly detection system 104 correspondingly updates the user interface as shown in FIG. 7C. In particular, FIG. 7C shows the user interface 702c comprises the anomaly threshold slider 710 being adjusted or repositioned (e.g., slid laterally to the right). As a result of the user interaction, the anomaly detection system 104 also updates (e.g., increases) the anomaly threshold. By updating the anomaly threshold, the anomaly detection system 104 in turn identifies more operation feature curves as anomalous. For example, as discussed above, the anomaly detection system 104 again compares feature probabilities with the updated anomaly threshold to identify anomalies.

Based on the updated anomaly threshold, the anomaly detection system 104 then modifies or updates the anomaly visualizations 706a-706c accordingly as shown in FIG. 7C. For example, the anomaly detection system 104 focuses a presentation of the common operation feature curves by excluding or removing the newly identified anomalous operation feature curves. Additionally, or alternatively, the anomaly detection system 104 changes an opacity or digital color of certain operation feature curves (e.g., ones that correspond to feature probabilities that now fail to meet or exceed the anomaly threshold).

In like manner, updates to loosen or decrease the anomaly threshold cause the anomaly detection system 104 to add (to the user interface) previously excluded operation feature curves that now comport with an updated anomaly threshold. Additionally, or alternatively, the anomaly detection system 104 can change digital colors or opacity levels of an operation feature curve to indicate an operation feature curve is now "common" (or non-anomalous) based on the adjusted anomaly threshold.

Figure 8:
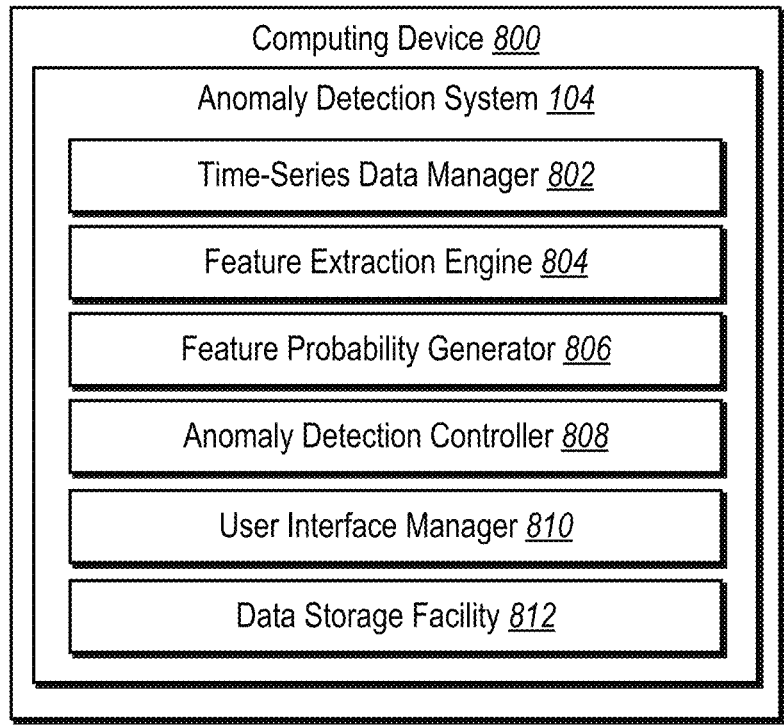
FIG. 8 illustrates an example schematic diagram of an anomaly detection system in accordance with one or more embodiments.

Turning to FIG. 8, additional detail will now be provided regarding various components and capabilities of the anomaly detection system 104. In particular, FIG. 8 illustrates an example schematic diagram of the anomaly detection system 104 implemented by a computing device 800 in accordance with one or more embodiments of the present disclosure. As also illustrated, the anomaly detection system 104 can include a time-series data manager 802, a feature extraction engine 804, a feature probability generator 806, an anomaly detection controller 808, a user interface manager 810, and a data storage facility 812.

The time-series data manager 802 can identify, generate, retrieve, request, store, transmit, convert, and/or analyze time-series data (as described in relation to the foregoing figures). In particular embodiments, the time-series data manager 802 identifies sensor data corresponding to one or more sensors associated with subterranean drilling equipment. For example, the time-series data manager 802 identifies chronological or time-stamped data for hookload, block position, pump flowrate, etc.

The feature extraction engine 804 generates, obtains, stores, and/or transmits operation features from the time-series data (as described in relation to the foregoing figures). In particular embodiments, the feature extraction engine 804 partitions the time-series data by splitting the time-series data into different data buckets corresponding to various levels of operation states, contextual data, etc. In addition, the feature extraction engine 804 filters the partitioned time-series data (e.g., utilizing a zero-lag DoG filter) to generate feature signals, such as velocity, acceleration, etc. Based on the feature signals, the feature extraction engine 804 can determine a variety of different operation features or discrete datasets (e.g., maximum velocity at time x).

The feature probability generator 806 determines feature probabilities for the operation features (as described in relation to the foregoing figures). In particular embodiments, the feature probability generator 806 converts the discrete datasets for operation features into continuous data. For example, the feature probability generator 806 utilizes a non-parametric model (e.g., Parzen's window method) to determine a probability density function for each operation feature. In turn, the feature probability generator 806 can determine a corresponding feature probability based on a probability density function.

The anomaly detection controller 808 determines operation anomalies based on feature probabilities (as described in relation to the foregoing figures). In particular embodiments, the anomaly detection controller 808 compares the feature probabilities to an anomaly threshold. Based on the feature-probability comparison, the anomaly detection system 104 can determine which operation features contribute to an overall operation anomaly.

The user interface manager 810 can provide, manage, and/or control a graphical user interface (or simply "user interface"). In particular, the user interface manager 810 may generate and display a user interface by way of a display screen composed of a plurality of graphical components, objects, and/or elements that allow a user to perform a function. For example, the user interface manager 810 can receive user inputs from a user, such as a click/tap to adjust an anomaly threshold slider or select a particular cluster of operation feature curves in an anomaly visualization. Additionally, the user interface manager 810 can present a variety of types of information, including text, digital media items, anomalous operation features, anomaly visualizations, or other information.

The data storage facility 812 maintains data for the anomaly detection system 104. The data storage facility 812 (e.g., via one or more memory devices) can maintain data of any type, size, or kind, as necessary to perform the functions of the anomaly detection system 104, such as time-series data for subterranean drilling equipment.

Each of the components of the computing device 800 can include software, hardware, or both. For example, the components of the computing device 800 can include one or more instructions stored on a computer-readable storage medium and executable by processors of one or more computing devices, such as a client device or server device. When executed by the one or more processors, the computer-executable instructions of the anomaly detection system 104 can cause the computing device(s) (e.g., the computing device 800) to perform the methods described herein. Alternatively, the components of the computing device 800 can include hardware, such as a special-purpose processing device to perform a certain function or group of functions. Alternatively, the components of the computing device 800 can include a combination of computer-executable instructions and hardware.

Furthermore, the components of the computing device 800 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 800 may be implemented as a stand-alone application, such as a desktop or mobile application. Furthermore, the components of the computing device 800 may be implemented as one or more web-based applications hosted on a remote server.

The components of the computing device 800 may also be implemented in a suite of mobile device applications or "apps." To illustrate, the components of the computing device 800 may be implemented in an application, including but not limited to an exploration and production software application like PETREL® or a DELFI® software application, such as, DRILLPLAN®, DRILLOPS®, EXPLORE- PLAN™, PRODOPS™, etc. Product names of one or more of the foregoing product names or software suites may include registered trademarks or trademarks of Schlumberger Technology Corporation in the United States and/or other countries. Similarly, the components of the computing device 800 can be implemented in third-party applications, such as SPOTFIRE® analytics.

FIGS. 1-8, the corresponding text, and the examples provide several different systems, methods, techniques, components, and/or devices of the anomaly detection system 104 in accordance with one or more embodiments. In addition to the above description, one or more embodiments can also be described in terms of flowcharts including acts for accomplishing a particular result. For example, FIG. 9 illustrates a flowchart of a series of acts 900 for identifying an operation anomaly of subterranean drilling equipment in accordance with one or more embodiments. The anomaly detection system 104 may perform one or more acts of the series of acts 900 in addition to or alternatively to one or more acts described in conjunction with other figures. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown, the series of acts 900 includes an act 902 of identifying time-series data for subterranean drilling equipment. In addition, the series of acts 900 further includes an act 904 of generating, utilizing a feature extraction model and from the time-series data, operation features defining operation of the subterranean drilling equipment over time. In certain embodiments, generating the operation features comprises utilizing the feature extraction model to filter the time-series data to estimate feature signals comprising at least one of velocity, acceleration, waveform peaks, or waveform troughs.

The series of acts 900 further includes an act 906 of generating feature probabilities for the operation features. In certain embodiments, generating the feature probabilities comprises determining probability density functions for discrete feature datasets partitioned from the time-series data.

The series of acts 900 further includes an act 908 of identifying an anomaly of the operation of the subterranean drilling equipment based on the feature probabilities for the operation features. In certain embodiments, identifying the anomaly comprises comparing the feature probabilities to an anomaly threshold.

It is understood that the outlined acts in the series of acts 900 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 9, act(s) in the series of acts 900 may include an act of: partitioning the time-series data based on operation states of the subterranean drilling equipment, the operation states comprising at least one of pre-connection activity, connection activity, or post-connection activity; and generating the operation features from the partitioned time-series data.

As another example of an additional act not shown in FIG. 9, act(s) in the series of acts 900 may include an act of providing, for display within a graphical user interface, an anomaly visualization comprising at least one of: a plain-text description of one or more operation features contributing to the anomaly; or a subset of feature probabilities for the one or more operation features contributing to the anomaly.

In yet another example of an additional act not shown in FIG. 9, act(s) in the series of acts 900 may include an act of: providing, for display within a graphical user interface, an operation feature curve for the time-series data together with additional operation feature curves for additional time-series data; and updating one or more operation feature curves based on a user interaction to adjust an anomaly threshold.

As a further example of an additional act not shown in FIG. 9, act(s) in the series of acts 900 may include an act of: generating, utilizing a feature extraction model, operation features defining operation of the subterranean drilling equipment over time by filtering the time-series data to estimate feature signals comprising at least one of velocity, acceleration, waveform peaks, or waveform troughs; generating feature probabilities for the operation features by converting discrete feature data from the feature signals to continuous feature data; and identifying an anomaly of the operation of the subterranean drilling equipment by comparing the feature probabilities for the operation features to an anomaly threshold.

In still another example of an additional act not shown in FIG. 9, act(s) in the series of acts 900 may include an act of filtering, utilizing the feature extraction model, the time-series data in a manner that minimizes temporal lag.

In another example of an additional act not shown in FIG. 9, act(s) in the series of acts 900 may include an act of: partitioning the time-series data based on operation states of the subterranean drilling equipment, the time-series data comprising at least one of hookload, block position, revolutions per minute, or pump flow rate; and generating the operation features from the partitioned time-series data.

In yet another example of an additional act not shown in FIG. 9, act(s) in the series of acts 900 may include an act of generating the feature probabilities for the operation features by utilizing a non-parametric model to estimate a probability density function based on the discrete feature data from the feature signals.

In still another example of an additional act not shown in FIG. 9, act(s) in the series of acts 900 may include an act of comparing the feature probabilities for the operation features to the anomaly threshold by: identifying a minimum feature probability of the feature probabilities; and comparing the minimum feature probability to the anomaly threshold, the anomaly threshold being a preset or user-configurable value.

As a further example of an additional act not shown in FIG. 9, act(s) in the series of acts 900 may include an act of providing, for display within a graphical user interface, an anomaly visualization comprising a subset of feature probabilities for one or more operation features contributing to the anomaly.

Additionally, in another example of an additional act not shown in FIG. 9, act(s) in the series of acts 900 may include an act of: identifying time-series data for subterranean drilling equipment; generating, utilizing a feature extraction model and from the time-series data, operation features defining operation of the subterranean drilling equipment over time; generating feature probabilities for the operation features; identifying an anomaly of the operation of the subterranean drilling equipment based on the feature probabilities for the operation features; and providing, for display within a graphical user interface, an anomaly visualization comprising at least one of: a plain-text description of one or more operation features contributing to the anomaly; or a subset of feature probabilities for the one or more operation features contributing to the anomaly.

Further, in another example of an additional act not shown in FIG. 9, act(s) in the series of acts 900 may include an act of: providing, for display within the graphical user interface, an interactive slider for adjusting an anomaly threshold; providing, for display within the graphical user interface, an operation feature curve of the time-series data together with additional operation feature curves for additional time-series data; and in response to detecting a sliding input to move the interactive slider, updating the anomaly threshold and one or more operation feature curves.

Also, in another example of an additional act not shown in FIG. 9, act(s) in the series of acts 900 may include an act of: adding one or more operation feature curves that satisfy the updated anomaly threshold; or performing at least one of: altering a digital color or opacity of one or more operation feature curves that fail to satisfy the updated anomaly threshold; or removing, from display, the one or more operation feature curves that fail to satisfy the updated anomaly threshold.

In addition, act(s) in the series of acts 900 may further include an act of: determining clusters of a plurality of operation feature curves that represent one or more operation features associated with a plurality of time-series data; and providing, for display within the graphical user interface, the clusters of the plurality of operation feature curves.

Still further, in another example of an additional act not shown in FIG. 9, act(s) in the series of acts 900 may include an act of: identifying, via the graphical user interface, a user interaction to select at least a portion of one or more clusters of the plurality of operation feature curves; and updating the anomaly visualization in response to identifying the user interaction.

Additionally, in another example of an additional act not shown in FIG. 9, act(s) in the series of acts 900 may include an act of: determining, for an operation feature, a difference score between two or more clusters; and providing, for display within the graphical user interface, the operation feature together with the difference score between the two or more clusters.

As another example of an additional act not shown in FIG. 9, act(s) in the series of acts 900 may include an act of: identifying contextual data for the subterranean drilling equipment, the contextual data comprising one or more of a drilling operator, date and time, geological formation, drilling metric, bottom-hole assembly, or drilling fluid; partitioning the time-series data based on the contextual data; and generating the operation features from the partitioned time-series data.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
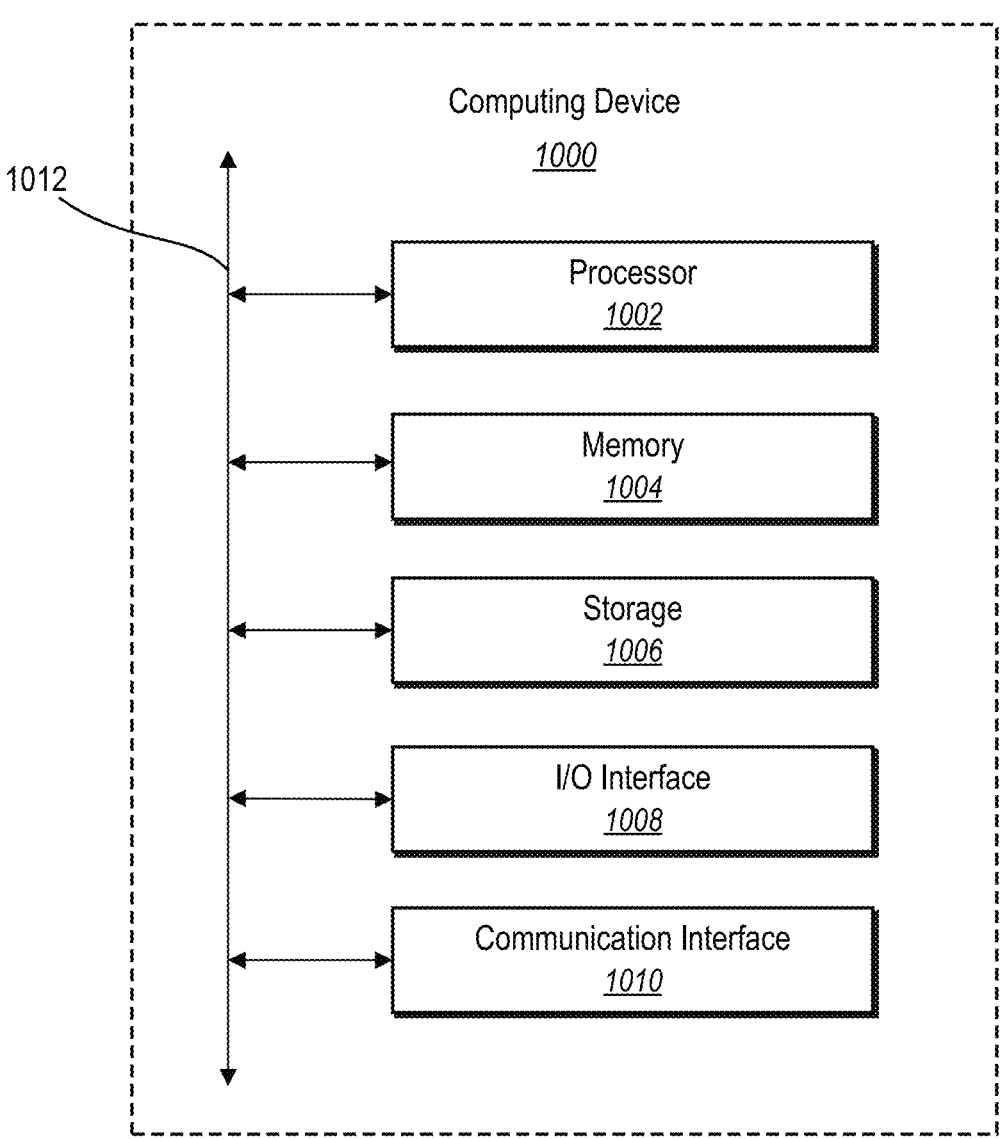
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the computing device 700, the computing device 800, the server(s) 102, the third-party server 106, or the client device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of the computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:

while operating subterranean drilling equipment having a plurality of operating states, each of the plurality of operating states defined by a plurality of operation features, wherein the subterranean drilling equipment includes a pump, each operation feature of the plurality of operation features defining operation of the subterranean drilling equipment over time:

collect, from the pump, first sensor data related to the operation of the subterranean drilling equipment, wherein the first sensor data includes a pump flowrate;

identify an operating state of the plurality of operating states of the subterranean drilling equipment, wherein the operating state includes a pre-connection activity, the pre-connection activity including at least one of drilling off, moving a drill string to a connection point, or stopping rotation and the pump;

identify first time-series data for the subterranean drilling equipment from the first sensor data;

identify contextual data that provides context to the first time-series data, wherein the contextual data includes drilling fluid data of a drilling fluid;

using the first time-series data and the contextual data, partition the first time-series data by splitting the first time-series data into a plurality of data buckets based on the operating state of the subterranean drilling equipment, each data bucket of the plurality of data buckets including partitioned first time-series data;

for one of the plurality of data buckets, filter the partitioned first time-series data to estimate feature signals based on smoothing one or more data spikes from signal noise of the partitioned first time-series data in a manner that reduces temporal lag when provided as an input to a feature extraction model, the feature signals describing the plurality of operation features;

extract, utilizing the feature extraction model and from the feature signals, the plurality of operation features, wherein the feature extraction model includes a feature machine-learning model trained to determine the plurality of operation features;

generate a plurality of first feature probabilities, each of the plurality of first feature probabilities associated with an operation feature of the plurality of operation features, wherein the plurality of first feature probabilities are estimated likelihoods that the operation feature of the plurality of operation features associated with a feature probability of the plurality of first feature probabilities corresponds to a certain value;

provide, for display within a graphical user interface, a feature curve representation of a plurality of feature curves for the plurality of operation features, the feature curve representation including a plurality of feature curve clusters, wherein the plurality of feature curves are displayed on the feature curve representation based on an anomaly threshold, and wherein each of the plurality of feature curve clusters are selectable;

receive, at the graphical user interface, a selection of a feature curve cluster of the plurality of feature curve clusters;

based on the selection of the feature curve cluster, populate an anomaly visualization on the graphical user interface, the anomaly visualization including the plurality of feature curves based on the selection of the feature curve cluster;

receive a user input at a feature probability slider on the graphical user interface, wherein the user input increases a probability threshold for the plurality of first feature probabilities;

using the user input, update the anomaly visualization by removing a feature curve of the plurality of feature curves based on removed feature probability of the feature curve being less than the probability threshold set by the user input;

identify, on the anomaly visualization and using the probability threshold set by the user input, a first anomaly of the operation of the subterranean drilling equipment based on the plurality of first feature probabilities for the plurality of operation features, wherein the first anomaly is an abnormality of the partitioned first time-series data, wherein identifying the first anomaly includes identifying a probability of the first anomaly being anomalous using an anomaly machine-learning model for probability density estimation;

based on the first anomaly and the operation feature, identify a lost time for a drilling operation associated with the operating state and the contextual data;

based on the first anomaly and the lost time, determine a corrective action to be performed by the subterranean drilling equipment, the corrective action including adjusting the drilling fluid;

based on the corrective action, adjust the drilling fluid by switching at least a portion of the drilling fluid for use by the subterranean drilling equipment;

after switching the drilling fluid, collect second sensor data and identify second time-series data from the second sensor data;

partition the second time-series data, filter the partitioned second time-series data, and extract the plurality of operation features from the filtered partitioned second time-series data; and generate a plurality of second feature probabilities and identify a second anomaly of the operation of the subterranean drilling equipment.

2. The non-transitory computer readable storage medium of claim 1, wherein the filtering the partitioned first time-series data includes filtering with a zero-lag Difference of Gaussian filter.

3. The non-transitory computer readable storage medium of claim 2, wherein the zero-lag Difference of Gaussian filter includes a half-filter defined in a temporal domain.

4. The non-transitory computer readable storage medium of claim 1, further comprising instructions that, when executed by the at least one processor, cause the computing device to generate the plurality of first feature probabilities for the plurality of operation features by determining probability density functions for discrete feature datasets partitioned from the first time-series data.

5. The non-transitory computer readable storage medium of claim 1, further comprising instructions that, when executed by the at least one processor, cause the computing device to provide, for display within the graphical user interface, a plain-text description of one or more of the plurality of operation features contributing to the first anomaly.

6. A system comprising:

one or more memory devices; and one or more server devices configured to cause the system to, while operating subterranean drilling equipment having a plurality of operating states, wherein the subterranean drilling equipment includes a pump, each of the plurality of operating states defined by a plurality of operation features, each operation feature of the plurality of operation features defining operation of the subterranean drilling equipment over time:

collect, from the pump, first sensor data related to the operation of the subterranean drilling equipment, wherein the first sensor data includes a pump flow-rate;

identify an operating state of the plurality of operating states of the subterranean drilling equipment, wherein the operating state includes a pre-connection activity, the pre-connection activity including at least one of drilling off, moving a drill string to a connection point, or stopping rotation and the pump;

identify first time-series data for the subterranean drilling equipment from the first sensor data;

identify contextual data that provides context to the first time-series data, wherein the contextual data includes drilling fluid data of a drilling fluid;

using the first time-series data and the contextual data, partition the first time-series data by splitting the first time-series data into a plurality of data buckets based on the operating state of the subterranean drilling equipment, each data bucket of the plurality of data buckets including partitioned first time-series data;

extract, utilizing a feature extraction model, the plurality of operation features, each operation feature of the plurality of operation features defining the operation of the subterranean drilling equipment over time by filtering the partitioned first time-series data to estimate feature signals based on smoothing one or more data spikes from signal noise of the first time-series data in a manner that reduces temporal lag when provided as an input to the feature extraction model, the feature signals comprising at least one of velocity, acceleration, waveform peaks, or waveform troughs, wherein the feature extraction model includes a feature machine-learning model trained to determine the plurality of operation features;

generate a plurality of first feature probabilities, each of the plurality of first feature probabilities associated with an operation feature of the plurality of operation features, wherein generating the plurality of first feature probabilities includes converting discrete feature data from the feature signals to continuous feature data, wherein the plurality of first feature probabilities are estimated likelihoods that the operation feature of the plurality of operation features associated with a feature probability of the plurality of first feature probabilities corresponds to a certain value;

provide, for display within a graphical user interface, a feature curve representation of a plurality of feature curves for the plurality of operation features, the feature curve representation including a plurality of feature curve clusters, wherein the plurality of feature curves are displayed on the feature curve representation based on an anomaly threshold, and wherein each of the plurality of feature curve clusters are selectable;

receive, at the graphical user interface, a selection of a feature curve cluster of the plurality of feature curve clusters;

based on the selection of the feature curve cluster, populate an anomaly visualization on the graphical user interface, the anomaly visualization including the plurality of feature curves based on the selection of the feature curve cluster;

receive a user input at a feature probability slider on the graphical user interface, wherein the user input increases the anomaly threshold for the plurality of first feature probabilities;

using the user input, update the anomaly visualization by removing a feature curve of the plurality of feature curves based on removed feature probability of the feature curve being less than the anomaly threshold set by the user input;

identify, on the anomaly visualization and using the anomaly threshold set by the user input, a first anomaly of the operation of the subterranean drilling equipment by comparing the plurality of first feature probabilities for the plurality of operation features to the anomaly threshold, wherein the first anomaly is an abnormality of the partitioned first time-series data, wherein identifying the first anomaly includes identifying a probability of the first anomaly being anomalous using an anomaly machine-learning model for probability density estimation;

based on the first anomaly and the operation feature, identify a lost time for a drilling operation associated with the operating state and the contextual data;

based on the first anomaly and the lost time, determine a corrective action to be performed by the subterranean drilling equipment, the corrective action including adjusting the drilling fluid;

based on the corrective action, adjust the drilling fluid by switching at least a portion of the drilling fluid for use by the subterranean drilling equipment;

after switching the drilling fluid, collect second sensor data and identify second time-series data from the second sensor data;

partition the second time-series data, filter the partitioned second time-series data, and extract the plurality of operation features from the filtered partitioned second time-series data; and generate a plurality of second feature probabilities and identify a second anomaly of the operation of the subterranean drilling equipment.

7. The system of claim 6, wherein the one or more server devices are configured to cause the system to smooth the one or more data spikes from the signal noise of the first time-series data using a zero-lag Difference of Gaussian filter.

8. The system of claim 6, wherein the one or more server devices are configured to cause the system to generate the plurality of first feature probabilities for the plurality of operation features by utilizing a non-parametric model to estimate a probability density function based on the discrete feature data from the feature signals.

9. The system of claim 6, wherein the one or more server devices are configured to cause the system to compare the plurality of first feature probabilities for the plurality of operation features to the anomaly threshold by:

identifying a minimum feature probability of the plurality of first feature probabilities; and comparing the minimum feature probability to the anomaly threshold, the anomaly threshold being a preset or user-configurable value.

10. A computer-implemented method comprising:

while operating subterranean drilling equipment having a plurality of operating states, each of the plurality of operating states defined by a plurality of operation features, wherein the subterranean drilling equipment includes a pump, each operation feature of the plurality of operation features defining operation of the subterranean drilling equipment over time:

collecting, from the pump, sensor data related to the operation of the subterranean drilling equipment, wherein the sensor data includes a pump flowrate;

identifying an operating state of the plurality of operating states of the subterranean drilling equipment, wherein the operating state includes a pre-connection activity, the pre-connection activity including at least one of drilling off, moving a drill string to a connection point, or stopping rotation and the pump;

identifying time-series data for the subterranean drilling equipment from the sensor data;

identifying contextual data that provides context to the time-series data, wherein the contextual data includes drilling fluid data of a drilling fluid;

using the time-series data and the contextual data, partitioning the time-series data by splitting the time-series data into a plurality of data buckets based on the operating state of the subterranean drilling equipment, each data bucket of the plurality of data buckets including partitioned time-series data;

filtering the partitioned time-series data to estimate feature signals based on smoothing one or more data spikes from signal noise of the time-series data in a manner that reduces temporal lag when provided as an input to a feature extraction model, the feature signals describing the plurality of operation features;

extracting, utilizing the feature extraction model and from the feature signals, the plurality of operation features, wherein the feature extraction model includes a feature machine-learning model trained to determine the plurality of operation features;

generating a plurality of feature probabilities, each of the plurality of feature probabilities associated with an operation feature of the plurality of operation features, wherein the plurality of feature probabilities are estimated likelihoods that the operation feature of the plurality of operation features associated with a feature probability of the plurality of feature probabilities corresponds to a certain value;

providing, for display within a graphical user interface, a feature curve representation of a plurality of feature curves for the plurality of operation features, the feature curve representation including a plurality of feature curve clusters, wherein the plurality of feature curves are displayed on the feature curve representation based on an anomaly threshold, and wherein each of the plurality of feature curve clusters are selectable;

receiving, at the graphical user interface, a selection of a feature curve cluster of the plurality of feature curve clusters;

based on the selection of the feature curve cluster, populating an anomaly visualization on the graphical user interface, the anomaly visualization including the plurality of feature curves based on the selection of the feature curve cluster;

receiving a user input at a feature probability slider on the graphical user interface, wherein the user input increases the anomaly threshold for the plurality of feature probabilities;

using the user input, updating the anomaly visualization by removing a feature curve of the plurality of feature curves based on removed feature probability of the feature curve being less than the anomaly threshold set by the user input;

identifying, on the anomaly visualization and using the anomaly threshold set by the user input, an anomaly of the operation of the subterranean drilling equipment based on the plurality of feature probabilities for the plurality of operation features, wherein the anomaly is an abnormality of the partitioned time-series data, wherein identifying the anomaly includes identifying a probability of the anomaly being anomalous using an anomaly machine-learning model for probability density estimation;

based on the anomaly and the contextual data, determining a corrective action to be performed by the subterranean drilling equipment, the corrective action including adjusting the drilling fluid; and implementing the corrective action with the subterranean drilling equipment.

11. The computer-implemented method of claim 10, further comprising determining the plurality of feature curve clusters, wherein the plurality of feature curve clusters represent one or more of the plurality of operation features associated with a plurality of time-series data.

12. The computer-implemented method of claim 11, further comprising:

determining, for the operation feature of the plurality of operation features, a difference score between two or more of the plurality of feature curve clusters; and updating the graphical user interface with the operation feature of the plurality of operation features together with the difference score between the two or more of the plurality of feature curve clusters.

* * * * *